United States Patent [19]

Kobayashi et al.

[11] Patent Number: 4,717,934
[45] Date of Patent: Jan. 5, 1988

[54] CAMERA SYSTEM

[75] Inventors: Ryuichi Kobayashi; Yoshihito Harada; Masaharu Kawamura, all of Kanagawa; Hiroyuki Kataoka, Tokyo; Toshiyuki Kumakura, Kanagawa, all of Japan

[73] Assignee: Canon Kabushiki Kaisha, Tokyo, Japan

[21] Appl. No.: 814,609

[22] Filed: Dec. 30, 1985

[30] Foreign Application Priority Data

| Dec. 28, 1984 | [JP] | Japan | 59-276498 |
| Dec. 28, 1984 | [JP] | Japan | 59-276499 |
| Dec. 28, 1984 | [JP] | Japan | 59-276500 |
| Dec. 28, 1984 | [JP] | Japan | 59-276501 |
| Dec. 28, 1984 | [JP] | Japan | 59-276502 |

[51] Int. Cl.$^4$ ............................................. G03B 15/05
[52] U.S. Cl. ................................. 354/415; 354/472; 354/127.1
[58] Field of Search ............... 354/415, 413, 420, 422, 354/423, 474, 472, 471, 127.1, 127.12, 127.13

[56] References Cited

U.S. PATENT DOCUMENTS

| 4,172,645 | 10/1979 | Tokutomi | 354/474 |
| 4,239,360 | 12/1980 | Urano | 354/474 |
| 4,297,011 | 10/1981 | Adams, Jr. | 354/127.13 |
| 4,299,463 | 11/1981 | Kawamura et al. | 354/127.12 |
| 4,465,353 | 8/1984 | Yoshida et al. | 354/415 |
| 4,547,057 | 10/1985 | Kataoka | 354/415 |
| 4,589,754 | 5/1986 | Maitani et al. | 354/472 |
| 4,610,525 | 9/1986 | Yoshida et al. | 354/415 |

Primary Examiner—Russell E. Adams
Attorney, Agent, or Firm—Toren, McGeady & Associates

[57] ABSTRACT

A camera system capable of performing flash photography is arranged to perform pre-flashing to detect beforehand the quantity of flash light to be obtained by main flashing. The system makes a display to show whether the flash light quantity thus detected assures an adequate exposure.

17 Claims, 19 Drawing Figures

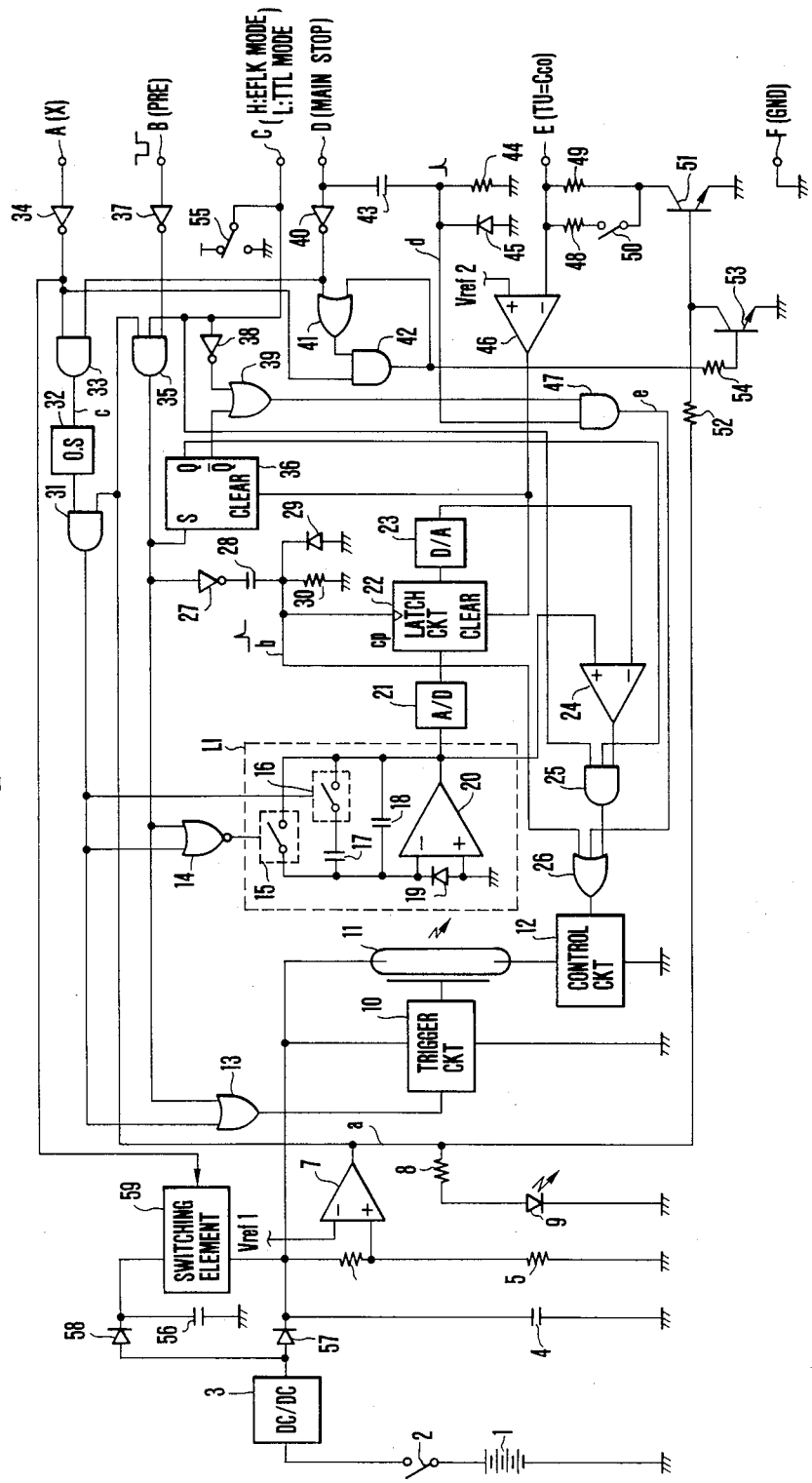
F I G. 1

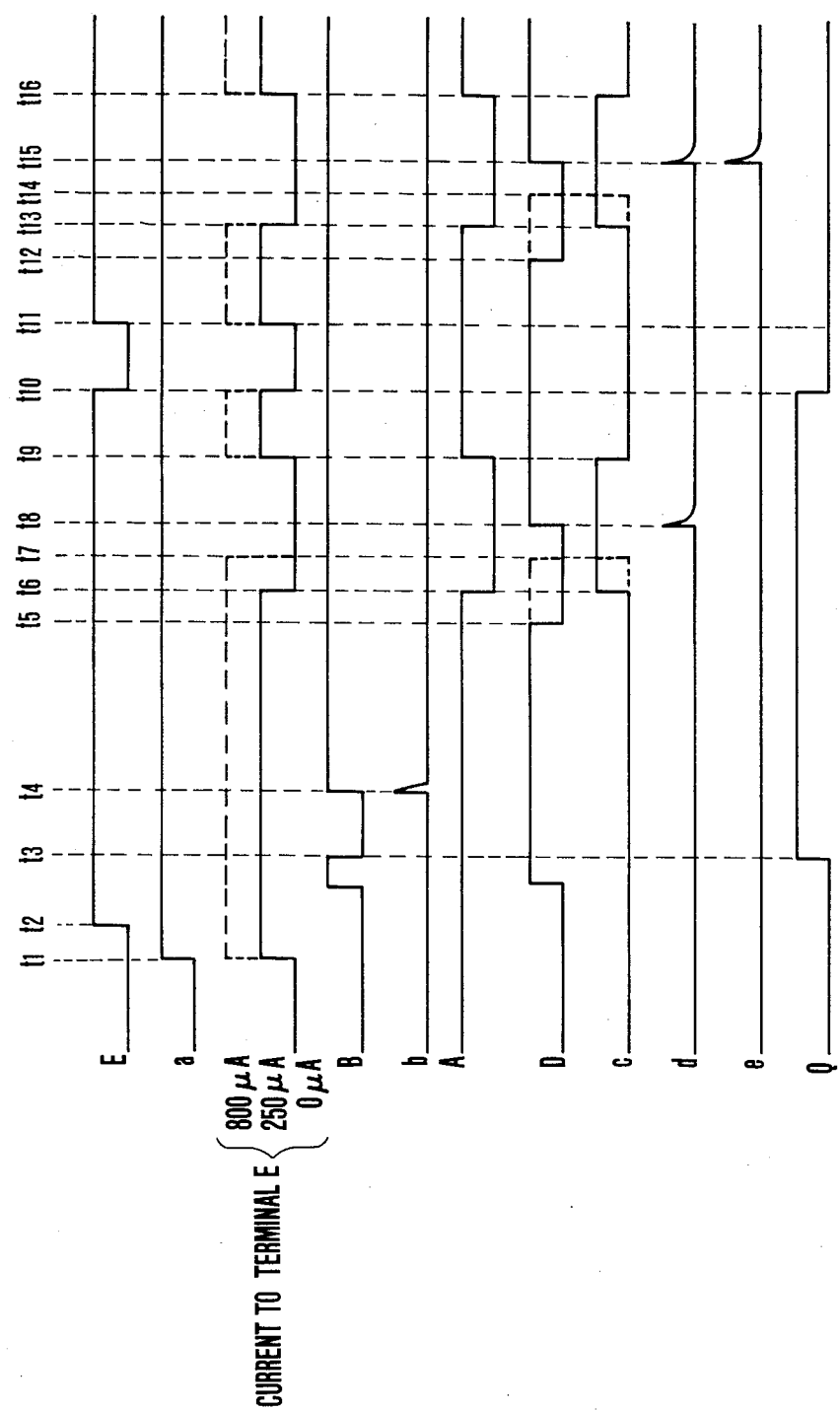

CAMERA SYSTEM

BACKGROUND OF THE INVENTION

1. Field of the Invention

This invention relates to a flash photographing apparatus.

2. Description of the Prior Art

Japanese Laid-Open Patent Application No. SHO 49-53418 discloses a technique for flash photography. According to the disclosure, a flash device is arranged to perform a pre-flashing action on an object to be photographed. A reflection light thus obtained from the object is detected through the lens (TTL) of a camera by means of a light receiving photo-sensitive element which is disposed within the camera. The quantity of the detected reflection light is integrated. Concurrently with this integrating process, a photo-sensitive element disposed close to the flashing part of the flash device directly detects the pre-flash light instead of the reflection light coming from the object. The quantity of the pre-flash light thus detected is also integrated. When the amount of the former integration reaches a predetermined level which varies with the sensitivity of the film in use, the latter integrating process is stopped. The result of the latter is stored. Following this, a main flashing action is performed. The quantity of the main flash light is detected by the photo-sensitive element disposed close by the flashing part. When the detected flash light quantity comes to be in a predetermined ratio to the above-stated result of integration, i.e. when the main flash light quantity reaches a predetermined relation to the pre-flash light quantity, the main flashing action is brought to a stop.

In accordance with the prior art technique disclosed in the above-cited Japanese patent application, the sequence of processes from pre-flashing to photographing including the detection of a reflection light resulting from pre-flashing, storing the level of the reflection light and performing the main flashing immediately after completion of pre-flashing are carried out in an automatic manner without allowing the photographer to know the photographic data obtained by pre-flashing.

However, according to this prior art disclosure, an arrangement to modify the continuous performance of the pre-flashing and the main flashing processes to have a sufficient period of time between these processes in a time serial manner makes it necessary to stop down the aperture of a photo-taking lens at the time of pre-flashing in the same manner as in exposing the film to light. This not only complicates the operation of the camera but also makes correction of an exposure difficult after pre-flashing.

To solve this problem, another technique was disclosed in Japanese Laid-Open Patent Application No. SHO 59-78325. In this case, in performing the pre-flashing process, light measurement is accomplished without stopping down the aperture of the photo-taking lens and the exposure correction is arranged to be carried out by performing a computing operation on information obtained by the pre-flashing and information about an aperture value. The disclosure further included an arrangement to make a bar display showing the quantity of flash light to be obtained by main flashing. This arrangement is called "flash EE lock."

The disclosed arrangement is capable of showing, when the pre-flashing action is performed, a quantity of main flash light required for adequately photographing an object. However, the arrangement is incapable of displaying any information on a measured light value determined on the basis of the result of measuring the exterior light or ambient light (such as a shutter time value or an aperture value determined on the basis of the level of the ambient light). For example, in taking a picture of a person standing with a twilight in the background by synchronized flash photography, it has been difficult to have both the person and the background adequately photographed, because: While the person which is the main object can be adequately photographed on the basis of the data obtained by pre-flashing, the aperture or the shutter time which must be adjusted for adequately photographing the background objects according to the brightness of the ambient light is automatically set for flash photography in response to completion of a charging process on a main capacitor irrespective of the brightness or luminance of these objects. Under that condition, therefore, such objects are not always adequately photographed and tend to be inadequately contrasted with the main object.

Further, in the same prior art arrangement, the information obtained by the pre-flashing and information on the aperture value, etc., required for actual photographing, are computed to obtain a quantity of light to be flashed during the main flashing action. By this, the main flash light quantity can be determined always at a value required for adequately photographing the object independently of any variations in the information about the aperture value, etc. In this case, however, the above-stated determination of the main flash light quantity is made without comparing it with the maximum flash light quantity available from the flash device. The prior art arrangement therefore has been incapable of giving any warning in the event that the main flash light quantity thus determined is in excess of the maximum light quantity available from the flash device.

In the case of flash photography using a flash device in combination with a camera of the kind having a focal plane shutter, if a photographing operation is performed at a shutter speed higher than a flash synchronizing speed, the image plane would not have its whole area exposed to the flash light and thus would come to have a slit exposure. To avoid this, many of known flash photographing apparatuses have been arranged as follows: Upon completion of a charging process on a main capacitor of a flash device with the flash device mounted on a camera, the shutter time of the camera is automatically shifted to a synchronizing shutter time irrespective of the shutter time value set on the camera.

Despite such an arrangement, however, if the charging process on the main capacitor is completed after a shutter time value has been determined with an operation performed on a shutter release button, an X-contact turns on to cause, upon completion of the travel of the leading curtain of the shutter, the flash device to flash. In that event, the photographing operation also results in a slit exposure.

Further, in the majority of the conventional flash photographing systems, flashing is arranged to be performed when the X-contact is turned on after completion of the travel of the leading shutter curtain. Further, as in the case of Japanese Laid-Open Patent Application No. SHO 56-168480, some of such systems are arranged to perform flashing immediately before commencement of the travel of a trailing shutter curtain. None of these prior art systems have been, however, arranged to freely determine a timing for flashing in an appropriate manner. Therefore, there has been known no flash photographing system that is capable of selecting an appropriate timing for flashing while the shutter is in an open state.

SUMMARY OF THE INVENTION

It is a principal object of the present invention to provide a flash photographing system which is capable of solving all the problems that have been presented by the prior art systems. More specifically, in a system wherein a flash device is arranged to perform a pre-flashing action on an object to be photographed; a reflection light thus obtained from the object is detected by a light receiving photo-sensitive element disposed within a camera; the quantity of the reflection light thus detected is integrated; concurrently with this integrating process, the pre-flash light, instead of the reflection light coming from the object, is directly detected by a photo-sensitive element disposed close to the flashing part of the flash device; the quantity of the pre-flash light thus detected is also integrated; then, when the amount of the former integration reaches a predetermined level which varies with the sensitivity of the film in use, the latter integrating process is stopped; the result of the latter integration is stored; following this, a main flashing action is performed; and the main flashing action is stopped when the quantity of the main flash light comes to be in a predetermined ratio to the stored result of integration to obtain thereby an adequate exposure: A first object of this invention is to make a display giving a warning upon detection of impossibility of an adequate exposure; and a second object is to make this display including a clear indication of a degree of deviation from the adequate exposure.

It is another object of this invention to provide a display device which is arranged to make a display, in the event of performing a flash device synchronized photographing operation under a dark condition with a flash device of the kind arranged to predetermine a main flashing light quantity by a pre-flashing action, showing whether or not both a main object and the background thereof can be photographed with an adequate exposure. Under this object, a camera system embodying this invention is provided with a display device wherein a difference between a controlled exposure value which is obtained from a predetermined combination of an aperture value and a shutter time value and an appropriate exposure value which is obtained by measuring the ambient or external light is displayed; a main flash light quantity which is determined by pre-flashing according to an aperture value, etc. is compared with the maximum flash light quantity of a flash device; and, in case that the main flash light quantity obtained by pre-flashing is greater than the maximum flash light quantity of the flash device, the difference of the former from the latter is displayed to urge the photographer to change either the aperture value or the shutter time value in such a way as to reduce the degree of the difference.

It is a further object of this invention to provide a flash photographing system which is arranged to have a timing determined at a desired point of time during a period after an X-contact is turned on in response to completion of the travel of a leading shutter curtain and immediately before commencement of the travel of a trailing shutter curtain. Under that object, a system embodying this invention is arranged to perform a flashing operation according to a signal representative of the AND (or logical product) of a flash permitting signal which is produced from the side of the camera and a signal produced with the X-contact turned on; and to permit selection of the timing for flashing as desired by setting means for setting the timing for procuding the flash permitting signal.

These and further objects and features of this invention will become apparent from the following detailed description of a preferred embodiment thereof taken in connection with the accompanying drawings.

BRIEF DESCRIPTION OF THE DRAWINGS

FIG. 1 is a circuit block diagram showing a flash device of an embodiment of this invention.

FIG. 2 is a timing chart showing the operation of cirucit blocks shown in FIG. 1.

FIG. 5a is a circuit diagram showing the details of an LCD display part shown in FIG. 4a.

FIG. 6a is a circuit diagram showing an LED display part included also in FIG. 4a.

FIGS. 7 to 12 are flow charts showing the operation of a micro-computer shown in FIG. 4a.

FIG. 13 shows a table to be used at a step S128 shown in FIG. 8.

DETAILED DESCRIPTION OF THE PREFERRED EMBODIMENT

Figure 3A:
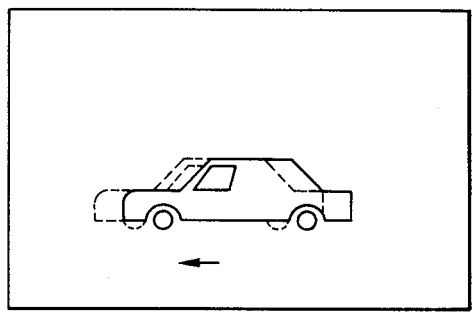
FIG. 3a is an illustration of a photograph taken by a slow synchronizing photographing operation performed in a leading shutter curtain synchronizing mode.

FIG. 1 shows circuit blocks included in a flash device arranged according to this invention. The illustration includes a battery 1 which is connected in series with a power supply switch 2; a DC/DC converter 3 which is arranged to boost the voltage of the power source battery 1; a capacitor 4 which is arranged to accumulate an energy for pre-flashing and has a smaller capacity than that of another capacitor 56; resistors 5 and 6 arranged to bleed the voltage of the capacitor 4; a comparator 7 which is arranged to detect completion of a charging process on the capacitor 4; a charge completion displaying LED 9 which has a resistor 8 connected in series therewith; a xenon discharge tube 11; a trigger circuit 10 for causing the discharge tube 11 to begin to flash; a control circuit 12 for performing series light adjustment; an OR gate 13; a NOR gate 14; switches 15 and 16 which are composed of FET's or the like and are arranged to be off when a control signal is at a low level and to be on when the signal is at a high level; a photo diode 19 which is positioned close by the xenon discharge tube 11 to detect the amount of light emission by the tube 11; capacitors 17 and 18 and an operational amplifier 20 which are arranged to form a known light integrating circuit LI; an A/D converter 21 formed by comparators arranged in parallel; a latch circuit 22; a D/A converter 23; a comparator 24 which is arranged to compare the output of the light integration circuit LI with the output of the D/A converter 23; an AND gate 25; an OR gate 26; an inverter 27; a capacitor 28; a diode 29; and a resistor 30. The capacitor 28, the diode 29 and the resistor 30 jointly form a differentiating circuit which detects the fall of a pulse. The illustration further includes an AND gate 31; a monostable multivibrator 32; an AND gate 33; an inverter 34; an AND gate 35; an RS flip-flop 36 which is provided with a clearing function and is arranged to be set upon receipt of a pre-flashing starting signal from a terminal B; inverters 37, 38 and 40; OR gates 39 and 41; AND gates 42 and 47; a capacitor 43; a resistor 44 and a diode 45 which jointly form a differentiating circuit; a comparator 46 which detects whether or not a voltage is applied to a terminal E; resistors 48 and 49 which are arranged to determine a quantity of a current to be supplied from the terminal E to the flash device; a switch 50 is arranged to make selection between a leading shutter curtain synchronizing mode and a trailing shutter curtain synchronizing mode, the former mode being selected when this switch is off and the latter when it is on; a transistor 51 which is arranged to turn on when the output level of the comparator 7 becomes high indicating completion of a charging process; resistors 52 and 54; a transistor 53 which is arranged to turn off the above-stated transistor 51; a mode selection switch 55 which is arranged to make selection between an EFLK mode and a TTL light measurement mode; and a main capacitor 56. As mentioned above, the capacity of the capacitor 56 is larger than that of the capacitor 4 which is arranged for pre-flashing. The capacity is determined according to the ratio of pre-flashing light quantity to main flashing light quantity. In other words, if the former is arranged to be 1/N of the latter, the capacity of the capacitor 4 is arranged to be 1/N of the sum of the capacity of the capacitor 4 and that of the capacitor 56. Therefore, for example, if the pre-flashing light quantity is 1/10 of the main flashing light quantity, the capacity of the capacitor 4 is arranged to be 1/9 of that of the capacitor 56. Diodes 57 and 58 are arranged to prevent an inverse current flow. A switching element 59 is arranged to be on when the output level of the inverter 34 is high, i.e. when an X-contact provided on the side of the camera turns on, and to be off when the output level of the inverter 34 becomes low. With the switching element 59 arranged in this manner, pre-flashing is performed with the energy accumulated at the capacitor 4 and main flashing with the energy which is accumulated at the capacitor 56.

The capacitors 17 and 18 of the light integrating circuit LI are likewise arranged to have their capacities set at values in a manner similar to those of the capacitors 4 and 56. Terminals A to F are provided for connection with a camera. The terminal A serves as an X-contact. The terminal B is arranged to receive from the camera a signal which controls commencement and termination of a pre-flashing action of the flash device. When the level of a signal coming to the terminal A changes from a high level to a low level, the flash device begins to perform the pre-flashing action. When it changes from the low level to the high level, the pre-flashing action comes to an end. The terminal C is arranged to transmit to the camera a signal representing a photographing mode set on the side of the flash device. The photographing system assumes the EFLK mode when this signal is at a high level and the TTL light control mode when it is at a low level. The terminal D is arranged as follows: When a high level signal is received at the terminal D, the flash device is inhibited from flashing until this signal changes from the high level to a low level even if the signal of the X-contact in the meantime changes from a high level to a low level. In addition to this, in the case of the TTL light control mode, the flashing action of the flash device is brought to a stop when the level of the signal coming via the terminal D changes from a low level to a high level. The terminal E is arranged to receive a constant voltage applied from the camera. The camera is arranged to be in the leading shutter curtain synchronizing mode or in the trailing shutter curtain synchronizing mode according to the quantity of a current flowing to the terminal E. The terminal F is provided for grounding.

The flash device which is arranged as described above operates in the following manner, which is described with reference to a time chart shown in FIG. 2:

Let us assume that the EFLK mode is selected by the switch 55 to have the output of the terminal C at a high level and that the switch 50 is off thus selecting the leading shutter curtain synchronizing mode. Under this condition, when the switch 2 turns on and the voltage of the main capacitor 4 is increased by the DC/DC converter 3, the level of the output "a" of the comparator 7 changes from a low level to a high level. This causes the LED 9 to light up and the transistor 51 to turn on, at a point of time t1. Following this, when a release button of the camera is operated to its first step of stroke at a point of time t2, a switch SW1 of the camera turns on. With the switch SW1 turned on, a constant voltage is applied to the terminal E to cause a predetermined current to flow to the resistor 49. In this instance, the switch 50 is in an OFF state. Therefore, the current flowing to the terminal E is of a relatively small value, such as 200 μA for example. After that, when a switch SW3 which is provided on the side of the camera for the purpose of causing the flash device to perform pre-flashing is turned on, a signal applied to the terminal B becomes a high level to cause a light measuring operation to be performed once on the ambient or external light. Upon completion of this light measurement, the signal of the terminal B comes to a low level, at a point of time t3. With the signal level of the terminal B having changed from the high level to the low level, the signal is inverted by the inverter 37. A rising signal thus obtained is supplied via the AND gate 35 and the OR gate 13 to the trigger circuit 10. Upon receipt of this signal, the trigger circuit 10 causes the xenon discharge (or flash) tube 11 to flash with the energy of the capacitor 4. At the same time, the level of the output of the NOR gate 14 becomes low and the switch 15 turns off. The light integrating circuit LI then begins to operate to integrate a portion of light quantity emitted by the xenon discharge tube 11. Further, since the switch 16 is off at that time, the light integrating circuit LI has only the integrating capacitor 18 which is of a small capacity connected to the feedback loop of the operational amplifier 20. Concurrently with the commencement of this integrating action, the flip-flop 36 is set in a manner similar to the trigger circuit 10. The level of the Q output of the flip-flop 36 becomes high and that of the $\overline{Q}$ output low. With the xenon discharge tube 11 caused to flash, a reflection light from the object resulting from this flashing is integrated by a light control circuit LC of the camera shown in FIG. 4a in a manner as will be described later herein. When the result of the integrating operation reaches a predetermined level, the signal applied to the terminal B changes from a low level to a high level, at a point of time t4. This rise of the signal causes a rising pulse "b" formed at the differentiating circuit consisting of the inverter 27, the capacitor 28, the diode 29 and the resistor 30. This pulse is supplied via the OR gate 26 to the control circuit 12. Upon receipt of this pulse, the control circuit 12 stops the xenon discharge tube 11 from flashing. The pulse is also supplied to the clock input terminal of the latch circuit 22. The A/D converter 21 is performing an A/D converting operation always on the integrated value of a portion of the flash light quantity of the xenon discharge tube 11. The result of this converting operation is latched at the latch circuit 22 when the flashing action of the xenon discharge tube 11 comes to a stop. A reflection light which results from the above-stated pre-flashing action with the pre-flashing light reflected by an object to be photographed comes to the camera. When the level of this incident light reaches a predetermined level, the quantity of the flash light emitted from the xenon tube 11 up to that time is stored at the latch circuit 22.

Figure 4D:
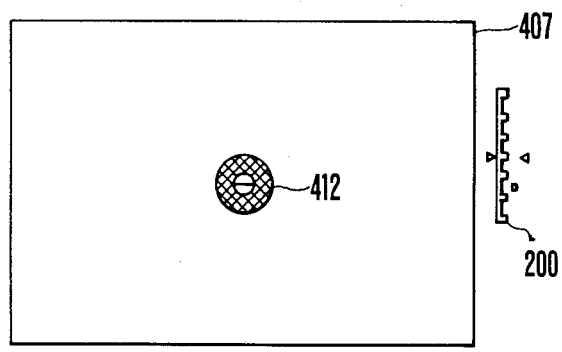
FIG. 4d is an illustration of a display made within the view finder of the camera shown in FIGS. 4a to 4c.
Figure 4A:
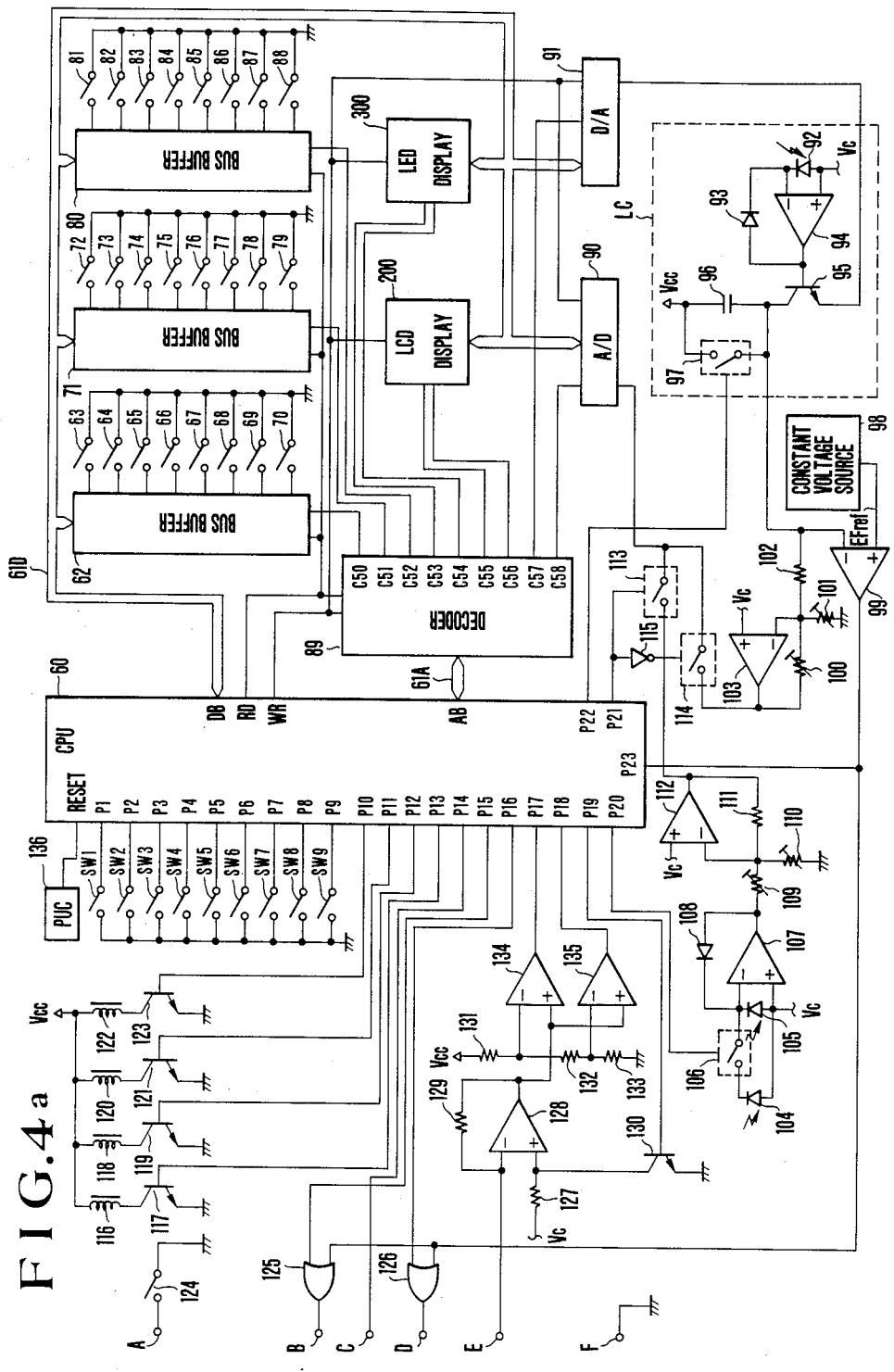
FIG. 4a is a circuit block diagram showing the control circuit of a camera to be used in combination with the flash device shown in FIG. 1.

After that, when the release button of the camera is pushed down to the second step of stroke thereof to cause thereby a switch SW2 which is shown in FIG. 4a to turn on, the flash device operates as follows: At a point of time t5, before the shutter curtain begins to travel, the level of the signal applied to the terminal D has been dropped to a low level as shown at a step S8 of the flow chart which will be described later. Upon completion of the travel of the leading shutter curtain, the X-contact turns on and the level of the signal applied to the terminal A becomes low, at a point of time t6. Since the output level of the inverter 40 is high at that point of time, the level of the output "c" of the AND gate 33 becomes high to make the output level of the monostable multivibrator 32 also high.

Under this condition, if the main capacitor 4 still remains in a completely charged state, the output of the AND gate 31 is supplied via the OR gate 13 to the trigger circuit 10. This causes the xenon tube 11 to flash. In that instance, the X-contact turns on to turn on the switching element 59 and the xenon tube 11 is caused to flash using both the energy of the capacitor 56 and that of the capacitor 4. At the same time, the output level of the AND gate 42 becomes high to turn on the transistor 53 and to turn off the transistor 51. This causes a change in the quantity of the inflow of a current via the terminal E from the camera. Detection of this change on the side of the camera enables the camera to accurately detect the time when the main flashing action is performed by the flash device.

Concurrently with flashing by the xenon tube 11, the output level of the NOR gate 14 becomes low. The switch 15 turns off. The switch 16 turns on. Therefore, at the light integrating circuit LI, the sum of the capacities of the capacitors 17 and 18 is connected to the feedback loop of the operational amplifier 20. Further, the output of the light integrating circuit LI produced during the process of flashing by the xenon tube 11 is supplied to the comparator 24. The comparator 24 compares this output with the output of the D/A converter 23. When the two come to agree with each other, the output level of the comparator 24 changes from a low level to a high level. The high level output of the comparator is supplied to the AND gate 25. At that time, as mentioned in the foregoing, the Q output of the flip-flop 36 is at a high level and the EFLK mode is selected by the switch 55. Therefore, the output level of the AND gate 25 becomes high concurrently with the change of the output level of the comparator 24. The high level output of the AND gate 25 is supplied via the OR gate 26 to the control circuit 12. This brings the flashing action of the xenon tube 11 to a stop. In this instance, since the output level of the OR gate 39 is low (as the $\overline{Q}$ output of the flip-flop 36 and the output of the inverter 38 are at low levels), the output "e" of the AND gate 47 is also at a low level. Therefore, even if a positive pulse "d" is produced from the differentiating circuit consisting of the capacitor 43, the resistor 44 and diode 45 in response to a flashing stop signal from the terminal D, the pulse "d" is not accepted as the output level of the AND gate 47 remains low. In other words, in case that the flash device is in the EFLK mode, the camera which is arranged to perform TTL light control by producing a flashing stop signal for bringing the flashing action of the flash device to a stop is not allowed to stop the flash devide from flashing even by means of that stop signal.

Again referring to FIG. 2 and particularly to points of time t11 to t16 indicated there, in case that the flash device is set in the EFLK mode by the switch 55 and the release switch of the camera is pushed down to the second step of stroke without pushing a pre-flashing switch on the side of the camera, the embodiment operates as follows: Under that condition, no signal is coming via the terminal B to the flash device. Therefore, the flip-flop 36 is never set and the Q output of it remains at a low level. The signal produced from the comparator 24 thus never comes to the control circuit 12 according to the information latched at the latch circuit 22. When the flashing stop signal is applied from the camera to the terminal D, i.e. when the level of the signal coming to the terminal D changes from a low level to a high level, the pulse signal "d" which is produced by the capacitor 43, the resistor 44 and the diode 45 is supplied via the AND gate 47 and the OR gate 26 to the control circuit 12 to stop thereby the xenon tube 11 from flashing.

Therefore, even if the flash device is set in the EFLK mode by the switch 55, if no operation is performed on the side of the camera for pre-flashing, a flashing operation can be stopped for an adequate exposure by means of the flashing stop signal produced by the camera.

In the event that the TTL light control mode is selected by the switch 55 and the terminal C is at a low level while the leading shutter curtain synchronizing mode is selected with the switch in its OFF position, the flash device operates as follows: In that instance, even if the pre-flashing switch is operated on the side of the camera and the level of the signal coming to the terminal B changes from a high level to a low level, this signal does not come to the trigger circuit 10. Therefore, the flash device never performs any flashing action.

Further, when the release button is pushed down to the second step of stroke thereof, the operation is performed in the same manner as in the case wherein the flash device is set in the EFLK mode by the switch 55 and the release switch is pushed down to the second step of its stroke without operating the pre-flashing switch on the side of the camera.

Next, in the event of selection of the trailing shutter curtain synchronizing mode by turning the switch 50 on, the flash device operates as follows:

In that event, with the switch 50 turned on, the resistor 48 is connected in parallel with the resistor 49. The impedance of the terminal E as viewed from the side of the camera becomes smaller. Accordingly, the current flowing from the camera becomes larger when a low voltage is applied to the terminal E. This enables the camera to detect the selection of the trailing shutter curtain synchronizing mode. As will be further described later, with the trailing shutter curtain synchronizing mode selected, the camera keeps the terminal D at a high level until immediately before commencement of the travel of the trailing shutter curtain. This is unlike the normal leading shutter curtain synchronizing mode, in which the level of the terminal D is caused to change from a high level to a low level immediately before the travel of the leading shutter curtain. (See steps S229 to S232 of the flow chart which will be described later.) Therefore, even when the signal level of the terminal A changes from a high level to a low level to make the level of one of the inputs to the AND gate 33 high via the inverter 34 with the X-contact having turned on upon completion of the travel of the leading shutter curtain, the output of the AND gate 33 remains at a low level until the level of the signal of the terminal D changes to a low level. The trigger circuit 10, therefore, receives no signal.

The signal level of the terminal D changes from the high level to the low level immediately before commencement of the travel of the trailing shutter curtain. In synchronism with this change of signal level, a signal comes to the trigger circuit 10 to cause the xenon tube to flash. The rest of the operation are similar to those of the leading shutter curtain synchronizing mode and are, therefore, omitted from description here.

Figure 3B:
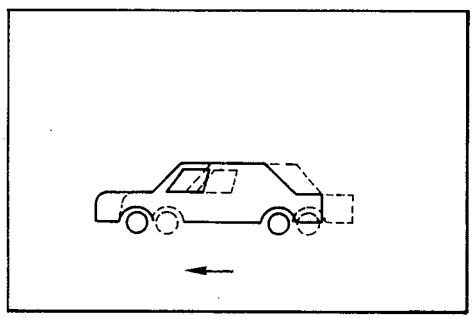
FIG. 3b is an illustration of a photograph taken by a slow synchronizing photographing operation performed in a trailing shutter curtain synchronizing mode.

Therefore, in the event of a photographing operation in a mode called slow synchronization for a moving object with the shutter time set at a value longer than a flash synchronizing time, the result of the operation becomes as follows: In the leading shutter curtain synchronizing mode, an object (an automobile, for example) can be adequately photographed with the flash light when it begins to move at the time of completion of the travel of the leading shutter curtain, as shown in FIG. 3a. After that, during a period before commencement of the trailing curtain of the shutter, the object is photographed in an under-exposed state as indicated by a broken line in the drawing. In other words, it gives an unnatural impression as if the obejct is moving in the reverse direction while the object is actually moving in the direction of arrow as shown in FIG. 3a. Meanwhile, in the case of the trailing shutter curtain synchronizing mode, the object is adequately photographed in its position on the move at the time of commencement of the travel of the trailing shutter curtain as shown by a full line in FIG. 3b. Whereas, in its position on the move before the above-stated point of time, the object is photographed in an under-exposed state as represented by a broken line in FIG. 3b. Therefore, in the case of the trailing shutter curtain synchronizing mode, the photograph of the object gives a natural impression with respect to the moving direction of the object. Next, referring to FIGS. 4a to 12, the camera which is to be used in combination with the flash device of FIG. 1 is arranged as described below:

FIGS. 4a to 4c and 5a to 6b show the hardware of the camera. FIG. 4a shows in a block diagram the control circuit of the camera. This illustration includes voltages Vcc and Vc which are supplied from power supply circuits which are not shown. A micro-computer 60 (hereinafter will be called CPU) is arranged to control the operation of the camera. The CPU 60 is of a one-chip type incorporating a ROM for a program and a RAM for storage (for example, Model 6805 of Motorola). An address bus 61A is of an 8 bit parallel arrangement. A data bus 61D is also of an 8 bit parallel arrangement. Reference numerals 62, 71 and 80 denote bus buffers of three states. Switches 63 to 70 are provided for setting dial which is not shown but is used for setting the ISO sentitivity value of a film. These switches 63 to 70 are arranged to receive the APEX value of ISO sensitivity which is encoded. Switches 72 to 79 are arranged at a lens mount part which is not shown to receive an encoded APEX value of an F number representing the maximum open aperture of the lens of the camera. Switches 81 to 88 are provided for aperture and shutter time setting dials and are arranged to receive setting values of aperture and shutter time. A decoder 89 is arranged to decode the signal of the address bus 61A of the CPU to and to selectively set the level of one of outputs CS0 to CS8 at a high level while the rest of these outputs are set at low levels. The camera includes an A/D converter 90; and a D/A converter 91 which is arranged to produce a voltage of Vc−18 mV×N for an input of a digital value N.

Figure 4C:
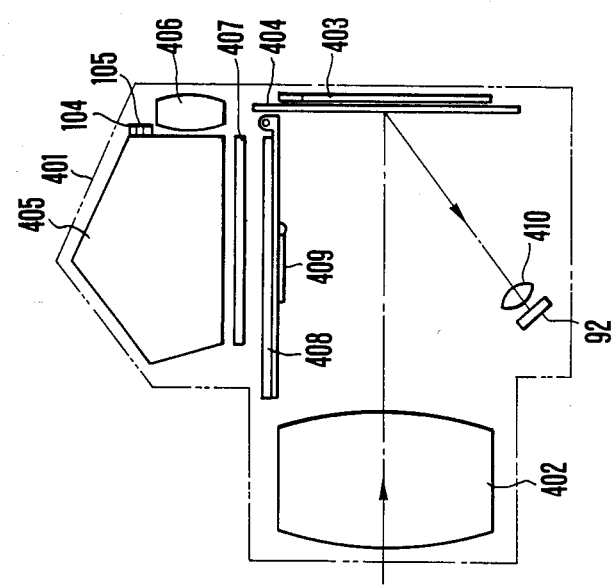
FIGS. 4b and 4c are sectional views showing the camera to be used with the flash device of FIG. 1 as in a state of having a mirror in a lowered position and in another state having the mirror in an uplifted position respectively.
Figure 4B:
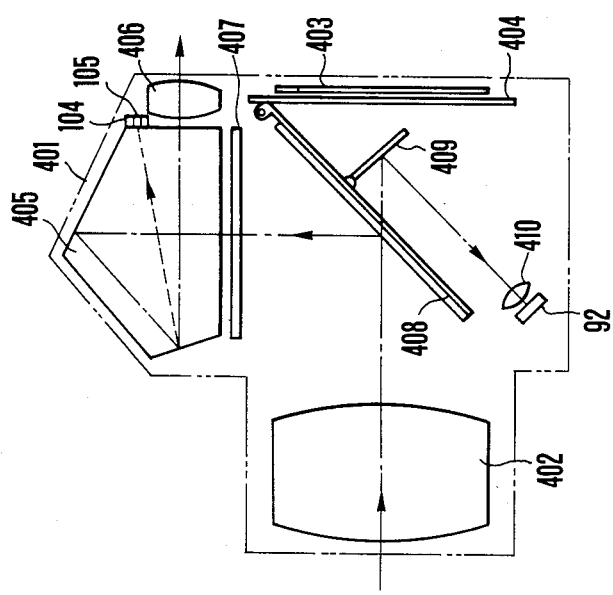

Elements 92 to 97 form a light control circuit LC of the camera which is provided for the purpose of accomplishing TTL light control on the side of the camera. The element 92 is a light receiving photo-sensitive element. Referring to FIGS. 4b and 4c, the light receiving element 92 is arranged to measure the middle part of a light flux coming through a sub-mirror 409 and the middle part of a quick return mirror 408 when the mirror 408 is in a lowered state and to measure a reflection light coming from the surface of the film when the mirror 408 is in an uplifted state. A diode 93 and an operational amplifier 94 jointly form a known ligarithmic compression circuit. An NPN transistor 95 has its base connected to the output terminal of the operational amplifier 94. The emitter of the transistor 95 is connected to the D/A converter 91 while the collector thereof is connected to a capacitor 96. The NPN transistor 95 is provided for expansion. A switch 97 is arranged to turn on upon receipt of a high level signal and is arranged in parallel with the capacitor 96.

To facilitate understainding, the operation of the light control circuit LC is briefly described as follows: Assuming that a photo current generated by the light incident upon the light receiving element 92 is Ispc, the ouput V94 of the operational amplifier 94 can be expressed by the following formula:

$$V94 = \frac{kT}{q} \cdot \log \frac{Ispc}{Is} + Vc \qquad (1)$$

Further, assuming that the voltage produced from the D/A converter 91 is Vc−18 mV×N as mentioned above, the current Ice flowing between the collector and emitter of the transistor 95 can be expressed as shown below:

$$Ice = Is \cdot e^{\frac{q}{kT}(V_{94} - V_c + 18mV \times N)} \quad (2)$$

Formulas (1) and (2) may be rearranged as shown below:

$$Ice = Is \cdot e^{\log \frac{Ispc}{Is}} \cdot e^{\frac{q}{kT} \cdot 18mV \times N}$$

$$= Ispc \times 2^{\log 2e \times \frac{q}{kT} \times 18mV \times N}$$

$$\approx Ispc \times 2^N$$

(wherein q represents the charge of electrons; k the constant of Boltzmann; and T absolute temperature.)

In other words, the photo current flowing from the light receiving element 92 decreases the output voltage of the D/A converter 91 by N×18 mV at a time. This causes the current flowing to the transistor 95 to be increased by 2N times. The collector current Ice of the transistor 95 is integrated by the capacitor 96 after the switch 97 turns off. Therefore, after the lapse of a period of time t from the turning off of the switch 97, the collector voltage V95 of the transistor 95 becomes as expressed below:

$$V_{95} = Vcc - \frac{1}{C} \int_0^t Ice \, dt \quad (3)$$

The camera is provided with a constant voltage source 98 and a comparator 99. The integration mentioned above causes the voltage of a node between the collector of the transistor 95 and the capacitor 96 to decrease from a constant voltage Vcc. When it becomes lower than a voltage EFref which is produced from the constant voltage source 98, the output level of the comparator 99 changes from a low level to a high level. The change indicates that the electric charge accumulated at the capacitor 96 has reached a predetermined amount. The camera, therefore, produces a flashing stop signal and supplies it to the flash device shown in FIG. 1.

The output of the D/A converter 91, the capacity of the capacitor 96 and the voltage of the constant voltage source 98 are set at such values that the flashing action comes to a stop when the film surface is irradiated with an appropriate amount of the flash light. For example, the capacity of the capacitor 96 and the voltage of the constant voltage source 98 are set at such values as to have the flashin stop signal produced from the comparator 99 when the light receiving element 92 receives a light quantity of 0.1 lux·sec. (an apposite exposure light quantity for a film of a sensitivity value ISO 100). Then, since the current Ice flowing between the collector and emitter of the transistor 95 doubles every time the output of the D/A converter 91 changes by 18 mV, the comparator 99 produces the flashing stop signal when the incident light quantity on the light receiving element reaches 0.2 lux·sec. if the output of the D/A converter 91 is V−18 mV or when the incident light quantity reaches 0.05 lux·sec. if the output is V+18 mV.

The camera is further provided with resistors 100 to 102; an operational amplifier 103 forming a circuit which is arranged to invert and amplify the collector voltage of the transistor 95; a light receiving element 104 which is arranged to measure the light of the peripheral part of a photographing frame; a light receiving element 105 which is arranged to measure the light of the middle part of the photographing frame; an electrical switch 106; an operational amplifier 107; and a diode 108. The operational amplifier 107 and the diode 108 are arranged to form a known logarithmic compression circuit.

When the switch 106 is open, a logarithmically compressed measured value of the luminance of the middle part of a photographing field is produced as the output of the operational amplifier 107. When the switch 106 is closed, the sum of photo currents produced from the light receiving elements 104 and 105, that is, a logarithmically compressed measured value of the luminance of the whole photographing field is produced. Resistors 109, 110 and 111 and an operational amplifier 112 form an inverting amplification circuit. Electrical switches 113 and 114 and an inverter 115 are arranged to select the input of the A/D converter 90 on the basis of a signal obtained from a port P21 of the CPU 60. A magnet 116 is arranged to initiate a mechanical sequence of processes for shutter release by releasing the camera from a first clamped state. A magnet 118 is arranged to actuate an automatic focusing process when it is energized and to bring the automatic focusing process to a stop when it is deenergized in such a way as to control an aperture value. Another magnet 120 is arranged to allow the leading shutter curtain of the camera to travel. A magnet 122 is arranged to allow the trailing shutter curtain of the camera to travel. Transistors 117, 119, 121 and 123 are provided for energizing these magnets. An X-contact switch 124 is arranged to shift its position from an OFF position to an ON position upon completion of the travel of the leading shutter curtain and to shift from the ON position to the OFF position when the trailing curtain begins to travel. The camera further includes OR gates 125 and 126; resistors 127 and 129; an operational amplifier 128; and a transistor 130. These circuit elements 127 to 130 form a circuit which operates as follows: The voltage of the terminal E is dropped to the ground level when the transistor 130 is on. The terminal E obtains the voltage Vc when the transistor 130 is off. At the same time, with the transistor 130 being off, the operational amplifier 128 produces a voltage corresponding to a current to be applied to the transistor 51 which is shown in FIG. 1. Voltage dividing resistors 131, 132 and 133 are arranged to produce reference voltages for comparators 134 and 135. The output level of the comparator 135 becomes high when a current exceeding a predetermined value (for example, 250 μA) flows from the terminal E. The other comparator 134 produces a high level output upon receipt of inflow of a current greater than the current at which the output level of the comparator 135 becomes high. A power-up-clear circuit 136 (hereinafter referred to as PUC circuit) is arranged to produce a low level output over a predetermined period of time when power supply from the power supply circuit which is not shown is switched on and, after the lapse of that period, comes to produce a high level output. A switch SW1 is arranged to turn on in response to the first step of stroke of a shutter release button. A switch SW2 is arranged to turn on when the button is further operated to the second step of its stroke. A switch SW3 is provided for causing a pre-flashing action of the flash device. A switch SW4 is arranged to turn on upon completion of film winding and to turn off when the mirror 408 which is shown in FIGS. 4b and 4c is uplifted. A switch SW5 is arranged to turn on upon completion of the travel of the trailing shutter curtain and to turn off during the process of film winding. A switch SW6 is arranged to effect switch-over between a spot light measuring mode and an averaging light measuring mode. A switch SW7 is arranged to produce one pulse every time the aperture of a stop or diaphragm member which is not shown is stopped down by one step. The switch SW7 thus repeats turning on and off a number of times corresponding to the stopped down extent of the aperture. A switch SW8 is provided for resetting the information which is obtained by pre-flashing performed in the EFLK mode. A switch SW9 is provided for switch-over between an aperture priority photographing mode and a shutter priority photographing mode. The switch SW9 is turned on for selecting the shutter priority photographing mode and turned off for the aperture priority photographing mode. A display part 200 is arranged to make a display with an LCD device. Another display part 300 is arranged to make a display with an LED device.

The camera which is arranged as described above is shown in sectional views in FIGS. 4b and 4c. FIG. 4b shows the camera with the mirror in a lowered position and FIG. 4c with the mirror in an uplifted position. The same elements as those shown in FIG. 4a are indicated by the same reference numerals in FIGS. 4b and 4c and their details are omitted from the following description:

Referring to FIGS. 4b and 4c, the illustration includes a camera body 401; a photo-taking lens 402; a film 403; a shutter 404; a pentagonal prism 405; an eyepiece 406; a focusing screen 407; a quick return mirror 408 which is a half reflection mirror; a sub-mirror 409 which is attached to the middle part of the mirror 408; a secondary image forming lens 410; the light receiving element 92 for light controlling which is also shown in FIG. 4a; a light receiving element 104 for light measurement by the averaging photometric method; and a light receiving element 105 for light measurement by the spot photometric method. In the case of FIG. 4b, a light flux coming through the lens 402 is reflected by the mirror 408. The reflected light is corrected into an erecting image at the pentagonal prism and is then formed on the focusing screen 407. This image is observable by the photographer through the eyepiece 406. The light receiving elements 104 and 105 are arranged to perform light measurement by the averaging and spot photometric methods by receiving light diffused within the pentagonal prism 405. With the camera arranged in this manner, when the mirror 408 is in the lowered position, the middle portion of the light incident upon the mirror 408 passes through the mirror 408 and is reflected by the sub-mirror 409. The light reflected by the sub-mirror is imaged via the secondary image forming lens 410 on the light receiving element 92.

When the mirror 408 is uplifted at the beginning of a photographing operation, the light receiving element 92 measures the reflection light coming from the whole surface of the film 403. In other words, the average of light incident on the whole surface of the film is measured.

FIG. 4d shows a display made within the view finder of the camera shown in FIGS. 4a to 4c. The display is made by the LCD display part 200 and the LED display part 300 shown in FIG. 4a. In FIG. 4d, a reference numeral 407 denotes the focusing screen as viewed from the view finder. A numeral 412 denotes a micro-split prism. The LCD display part 200 makes an LCD display on the right-hand side of the focusing screen 407. The LED display part 300 makes a display on the lower side of the focusing screen showing a shutter time value and an aperture value. The range of area visible through the view finder corresponds to the photographing frame mentioned in the description of the light receiving elements 104 and 105 made in the foregoing with reference to FIG. 4a.

Figure 5A:
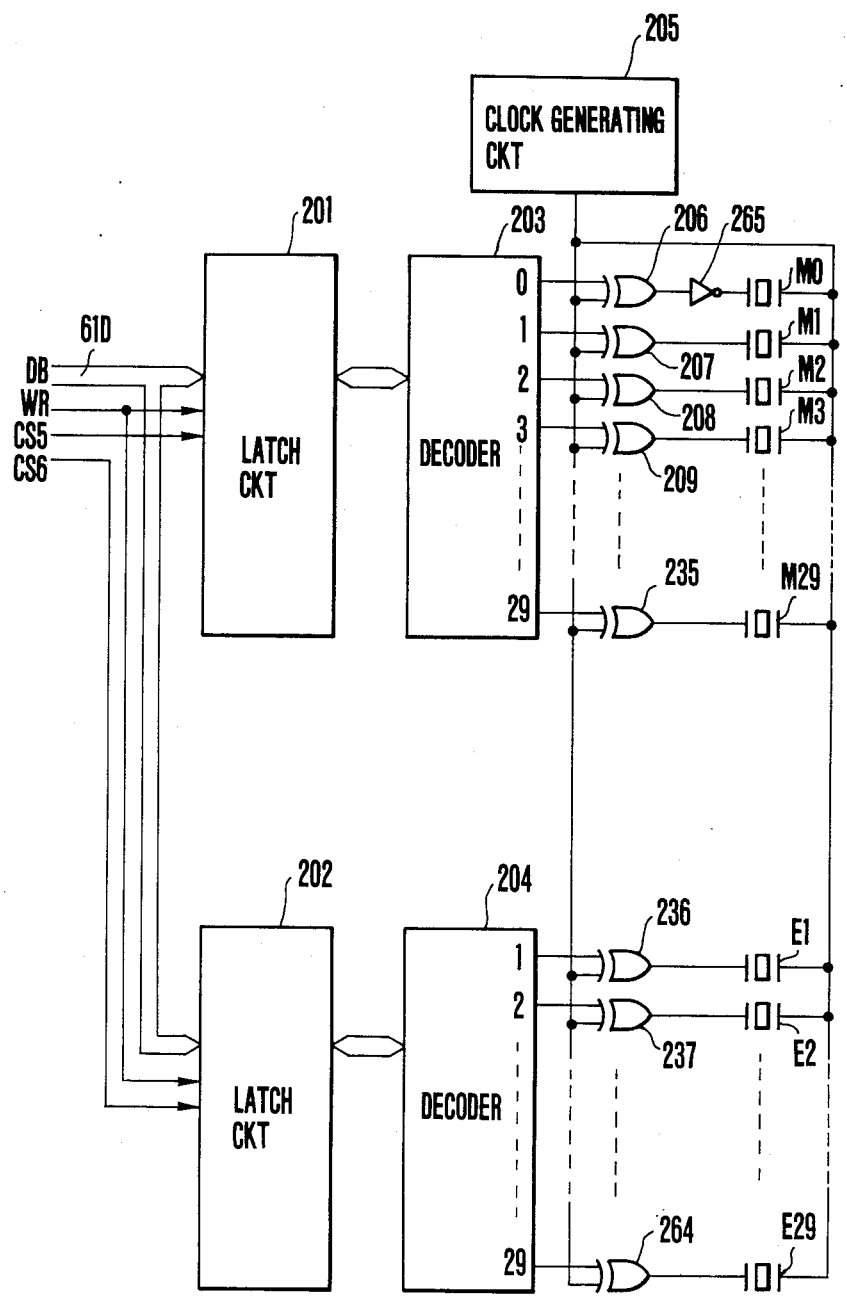
Figure 5B:
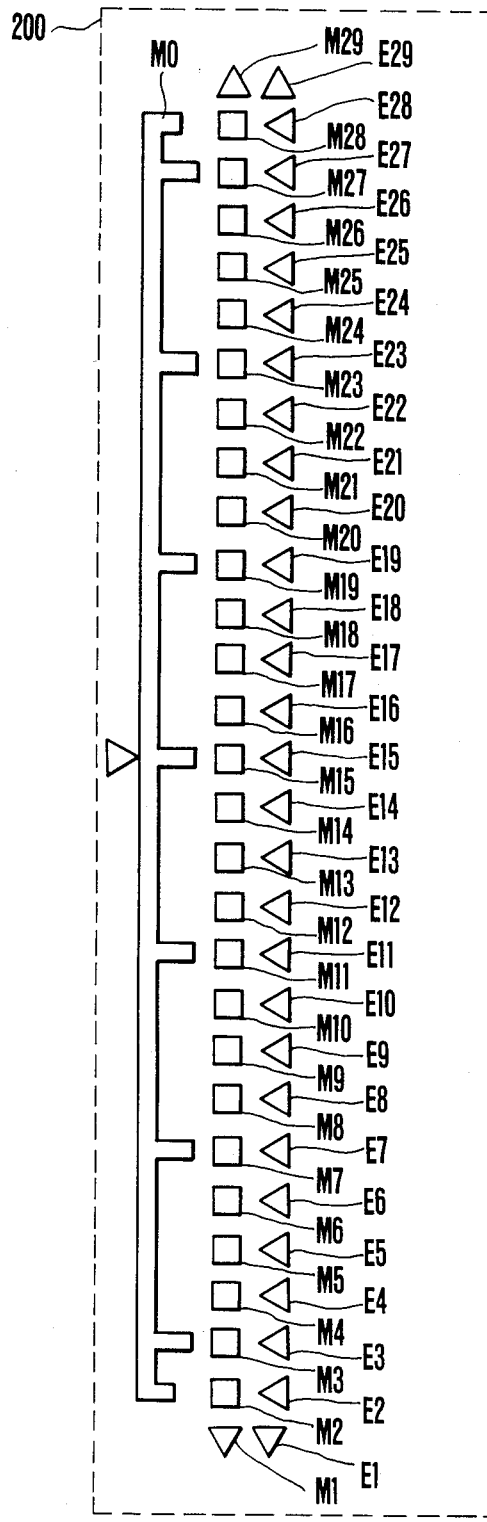
FIG. 5b shows the arrangement of display elements of the LCD display part.

The details of the LCD display part 200 are arranged as shown in FIGS. 5a and 5b. The details of the LED display part 300 are arranged as shown in FIGS. 6a and 6b.

FIG. 5a is a circuit diagram showing the LCD display part 200. FIG. 5b shows the arrangement of display elements of the LCD display part 200. Referring to these drawings, liquid crystal elements E1 to E29 and M0 to M29 are arranged to show whether the amount of flash light is adequate or not and whether the shutter time and aperture values which have been selected are apposite to the ambient or external light. They are aligned in the manner as shown in FIG. 5b.

The liquid crystal elements M15 and E15 are driven to indicate an adequate exposure. The liquid crystal elements M14 and E14 are driven in the case of an under exposure deviating by ¼ step from the adequate exposure. The liquid crystal elements M16 and E16 are driven in the case of an over exposure deviating by ¼ step from the adequate exposure. In this manner, the display is made on the unit of ¼ step. Latch circuits 201 and 202 are arranged to read in and hold the 8-bit data of the data bus 61D in the forms of the AND of a write signal WR and a chip select signal CS5 and that of the write signal WR and another chip select signal CS6, respectively. Decoders 203 and 204 are arranged to decode the 8-bit data latched at the latch circuits 201 and 202. Each of them makes the level of only one output high while making those of the rest all low. A clock pulse generating circuit 205 is arranged to generate clock pulses for liquid crystal display. The illustration includes exclusive OR gates 206 to 264 and an inverter 265. Voltages applied to both ends of each of the liquid crystal elements M1 to M29 and E1 to E29 become anti-phase pulses to cause the element to light up when the corresponding output of the decoder 203 or 204 is at a high level. These voltages become in-phase to put out the element when the corresponding output is at a low level. In case that the data latched at the latch circuits 201 and 202 are both "0", all the liquid crystals are extinct. In other cases, the liquid crystal elements which are selected by a scale display made by the liquid crystal M0 and the latch circuits 201 and 202 come to light up one by one. The scale display which is indicated by the liquid crystal element M0 is provided with projections. These projections are arranged on the right-hand side of the scale display at a part indicated by an adequate exposure mark and other parts which are spaced by one step.

Figure 6A:
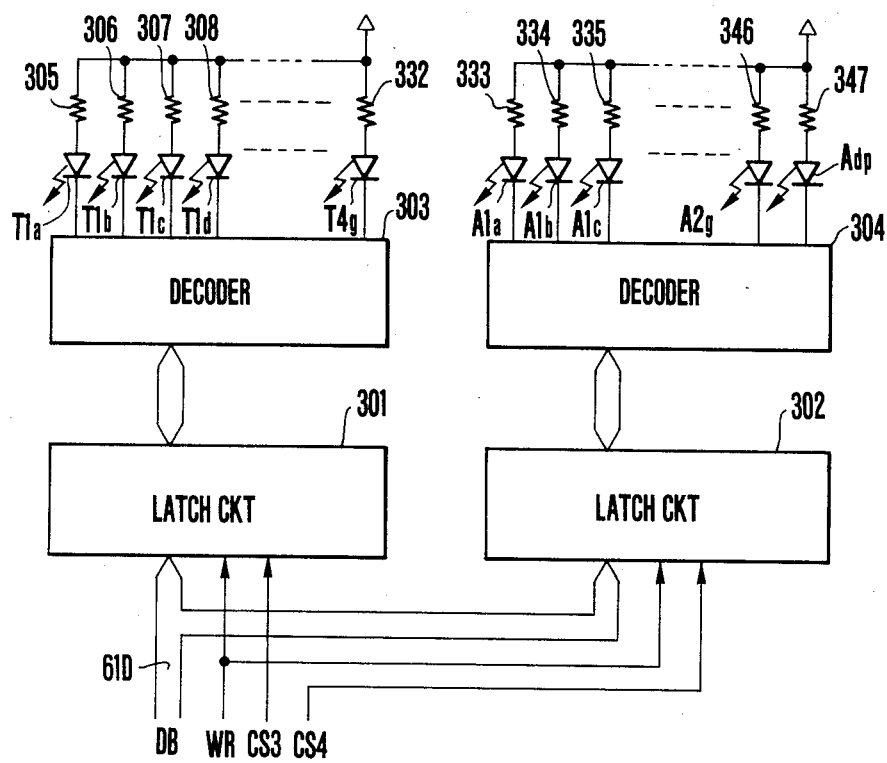
Figure 6B:
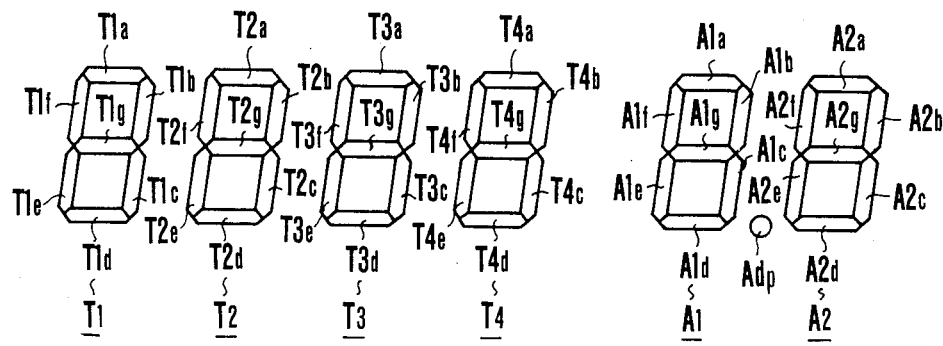
FIG. 6b shows the arrangement of the display elements of the LED display part.
Figure 7:
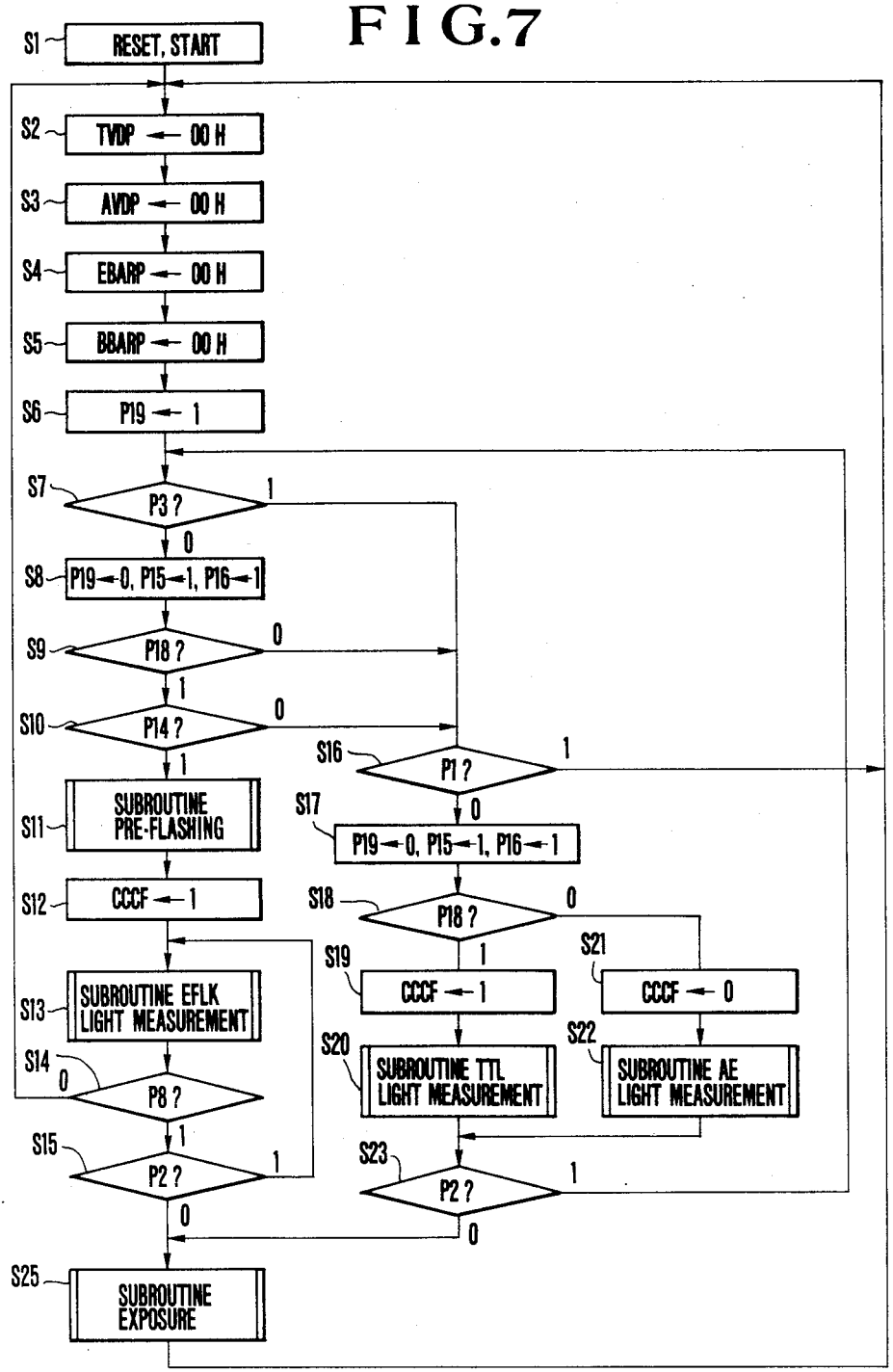

FIG. 6a is a circuit diagram showing the LED display part 300. FIG. 6b shows the arrangement of the display elements included in the LED display part 300. The illustration includes latch circuits 301 and 302 which are arranged to write in and hold the 8-bit data of the data bus 61D in the forms of the AND of a write signal WR and a chip select signal CS3 and the AND of the signal WR and another chip select signal CS4, respectively. A decoder 303 is arranged to decode the data of shutter time latched at the latch circuit 301 and to have the shutter time displayed by 7-segment LED's T1 to T4. The 7-segment LED's T1 to T4 are composed of LED's T1a to T4g which are connected to a power source via resistors 305 to 332.

Assuming that the data latched at the latch circuit 301 represents a shutter time value of 1/70 sec., the decoder 303 operates to obtain a 7-segment display of "60" by causing the LED's T3a, T3c, T3d, T3e, T3f, T3g, T4a, T4b, T4c, T4d, T4e and T4f to light up while the rest of the LED's are extinct.

Further, when the data latched at the latch circuit 301 is 00, all the LED's T1a to T4g are extinct. Meanwhile, the decoder 304 is arranged to decode the data of an aperture value latched at the latch circuit 302 and to have it displayed by 7-segment LED's A1 and A2. The 7-segment LED's A1 and A2 are composed of LED's A1a to A2g and Adp, which are connected via resistors 333 to 346 and 347 to the power source respectively. Assuming that the data latched at the latch circuit 302 represent an aperture value of "1.2", the decoder 304 operates to have a 7-segment display of "1.2" by causing the LED's A1b, A1c, A2a, A2b, A2d, A2e, A2g and Adp to light up while the rest are extinct. Further, in the event that the data of the latch circuit 302 is "00", all the LED's A1a to A4g and Adp remain extinct.

Next, referring to FIGS. 7 to 12, the details of operation of the micro-computer which is shown in FIG. 4a and is arranged to control the operation of the camera are as described below:

In the flow charts of FIGS. 7 to 12 and the description of them, for the sake of simplification, the address bus 61A which is shown in FIG. 4a is expressed as AB; the data bus 61D as DB; the switches 63 to 70 which are provided for setting an ISO film sensitivity value as ISOP; the switches 72 to 79 which are provided at the lens mount part for reading in the maximum aperture F number of the lens as AVOP; the switches 81 to 88 which are provided for setting either an aperture value or a shutter time value as ATP; the latch circuits for latching the data for the LCD display as MBARP and EBARP, respectively; the LED display data latching circuit 301 which latches the shutter time data as TVDP; the other LED display data latching circuit 302 which latches the aperture data as AVDP; the A/D converter 90 as ADP; and the D/A converter as DAP. Further to facilitate understanding, these elements are sometimes spelled out instead of using the abbreviations defined above. Further, abbreviations Av, Tv, Sv, Bv, Avc, Avo, EF, AvNEW, TvNEW, TvMIN, TvMAX and EFref are used to mean, respectively an aperture value, a shutter time value, an ISO sensitivity value, an object brightness or luminance value, a stepwise stopped down aperture value, a maximum lens opening aperture value, a received quantity of pre-flashing light, a computed aperture value, a computed shutter time value, the lowest shutter speed, the highest shutter speed, and a register storing the data of an A/D converted value of a voltage produced from the constant voltage source 98. Further, abbreviations "TIMERF" and "CCCF" means flags. The flag TIMERF becomes "1" at a point of time when the time counting by a timer circuit TIMER disposed within the CPU 60 comes to an end. The other flag CCCF becomes "1" when a pre-flashing action is performed with the EFLK mode selected. In the following flow charts showing the operation of the micro-computer, each step and the instruction at the step are first described; and, after that, the operation of the microcomputer is described along with the operation of the whole camera shown in FIG. 4a.

Let us assume a case where film winding has been completed; the switch SW5 is on; the input port P5 is at a low level; the power supply switch 2 of the flash device shown in FIG. 1 is on; the capacitor 4 has been completely charged; the EFLK mode is selected by the mode selection switch 55; the switch 50 is off; and thus the leading shutter curtain synchronizing mode is selected. In this case:

Step S1: With a power supply voltage first switched on by a power supply circuit which is not shown, when the PUC circuit 136 which is shown in FIG. 4a causes the reset terminal of the CPU 60 to be at a low level, all the output ports of the CPU 60 become low levels to have "0" written into all registers.

Step S2: TVDP←00H. This instruction means to produce "0" of the sexadecimal notation to the TVDP port. The symbol "H" denotes the sexadecimal notation. In response to this instruction, the CPU 60 produces the address of TVDP, such as "43H", at the address bus AB and "00H" at the data bus DB. After that, the level of the write terminal WR changes to a low level for a predetermined period of time. As a result, the decoder 89 makes the level of the output CS3 high and those of other outputs CS0, CS1, CS2, CS4 to CS8 low. Accordingly, the latch circuit 301 is selected. The latch circuit 301 alone receives the data "00H" of the data bus DB. The latch circuit 301 holds the data "00H" and supplies it to the decoder 303. The decoder 303 decodes the data and applies it to the shutter time displaying LED's T1a to T4g as applicable. However, since the data produced from the latch circuit 301 is "00H" in this instance, the decoder 303 leaves all the LED's T1a to T4g extinct.

Step S3: AVDP←00H. The data "00H" is produced to the latch circuit 302 in exactly the same manner as in the case of Step S2. This causes the aperture value displaying LED's A1a to A2g and Adp to be extinct.

Step S4: EBARP←00H.
Step S5: BBARP←00H.

At both the steps S4 and S5, the data "00H" is written into the latch circuts 201 and 202 of the LCD display circuit 200. By this, the LCD display is completely erased.

Step S6: P19←1. This is an instruction to make the level of the output of a port P19 a high level. In response to this, the transistor 130 turns on. In this instance, as shown in FIG. 1, the terminal E of the flash device is connected to the input terminal of the comparator 46 and is connected via a resistor also to the collector of the transistor 51 the emitter of which is connected to the ground. Therefore, the output level of the comparator 128 drops to a level close to the ground level. Thus, the level of the terminal E also becomes low. As a result, the output level of the comparator 46 becomes high to clear the latch circuit 22 of the flash device.

Step S7: P3? This is an instruction to detect the state of an input port P3. If the pre-flashing switch SW3 is off and the port P3 is at a high level, the flow of the operation shifts to a step S16. If the pre-flashing switch SW3 is on and the port P3 is at a low level, the operation proceeds to a step S8. Let us here assume that the pre-flashing switch SW3 is not on and the operation shifts to the step 16. Then:

Step S16: P1? The instruction here means to detect, from the state of an input port P1, the state of the switch SW1 which is arranged to be turned on by the first step of stroke of a pushing operation on the shutter release button in a manner similar to the step S7. The flow of operation shifts to the step S2 if the release button is not pushed to the first stroke. The operation proceeds to a step S17 if the button is pushed to that extent. Therefore, the loop of steps S2 to S7 and S16 is continuously repeated if both of the switches SW1 and SW3 are not turned on.

Then, if the photographer catches a main object in the middle part of the view finder and turns on the pre-flashing switch SW3 to have the preflashing action performed, the flow of operation shifts to the step S8.

Step S8: P19←0, P15←1 and P16←1. With this instruction carried out, a low level signal is produced from the port P19. It causes the transistor 130 to turn off. The operational amplifier 128 then operates to bring the voltage of the terminal E to the level of the voltage Vc. At the same time, with the levels of the ports P15 and P16 becoming high, the levels of the voltages of the terminals B and C become high to inhibit any flashing action.

Step S9: P18? The state of an input port P18 is detected. If the capacitor 4 of the flash device shown in FIG. 1 has been completely charged, the transistor 51 is on. Therefore, a constant current (for example, 250 μA) which is determined either by a resistor 49 or by both resistors 49 and 48 is pulled down through the resistor 49. As a result, the output of the operational amplifier becomes Vc+R129×250 μA (wherein R129 represents the resistance value of the resistor 129).

Therefore, the output level of the comparator 135 becomes high to enable the CPU 60 to detect the charging completed state of the flash device. In this instance, even if either the trailing shutter curtain synchronizing mode or the leading shutter curtain synchronizing mode is selected by means of the switch 50 on the side of the flash device, the output level of the comparator 135 becomes high upon completion of the charging process of the flash device. As mentioned at the beginning of this description of the flow of operation of the CPU 60, the flash device is in the state of having completely charged in this instance. Therefore, the flow of operation comes to a step S10.

Step S10: P14? This is an instruction to detect the state of an input port P14. At this step, the port is checked for finding whether the mode selection switch 55 of the flash device of FIG. 1 is in its position for the EFLK mode. However, in this instance, the switch 55 is selecting the EFLK mode as mentioned at the beginning of this description of the flow of operation. Therefore, the port P14 is at a high level. Accordingly, the operation proceeds to a step S11.

Step S11: Pre-flashing subroutine. In this subroutine, the flash device is caused to perform a pre-flashing action before photographing. The amount of the main flash light to be used for photographing is determined according to a reflection light coming from the object as a result of the pre-flashing action. The details of the subroutine are as shown in the flow chart shown in FIG. 8.

Before the pre-flashing action, a flow of operation is carried out to determine an aperture value and a shutter time value from the external light, the ISO sensitivity value of film and a preset value of the aperture or shutter time.

Figure 8:
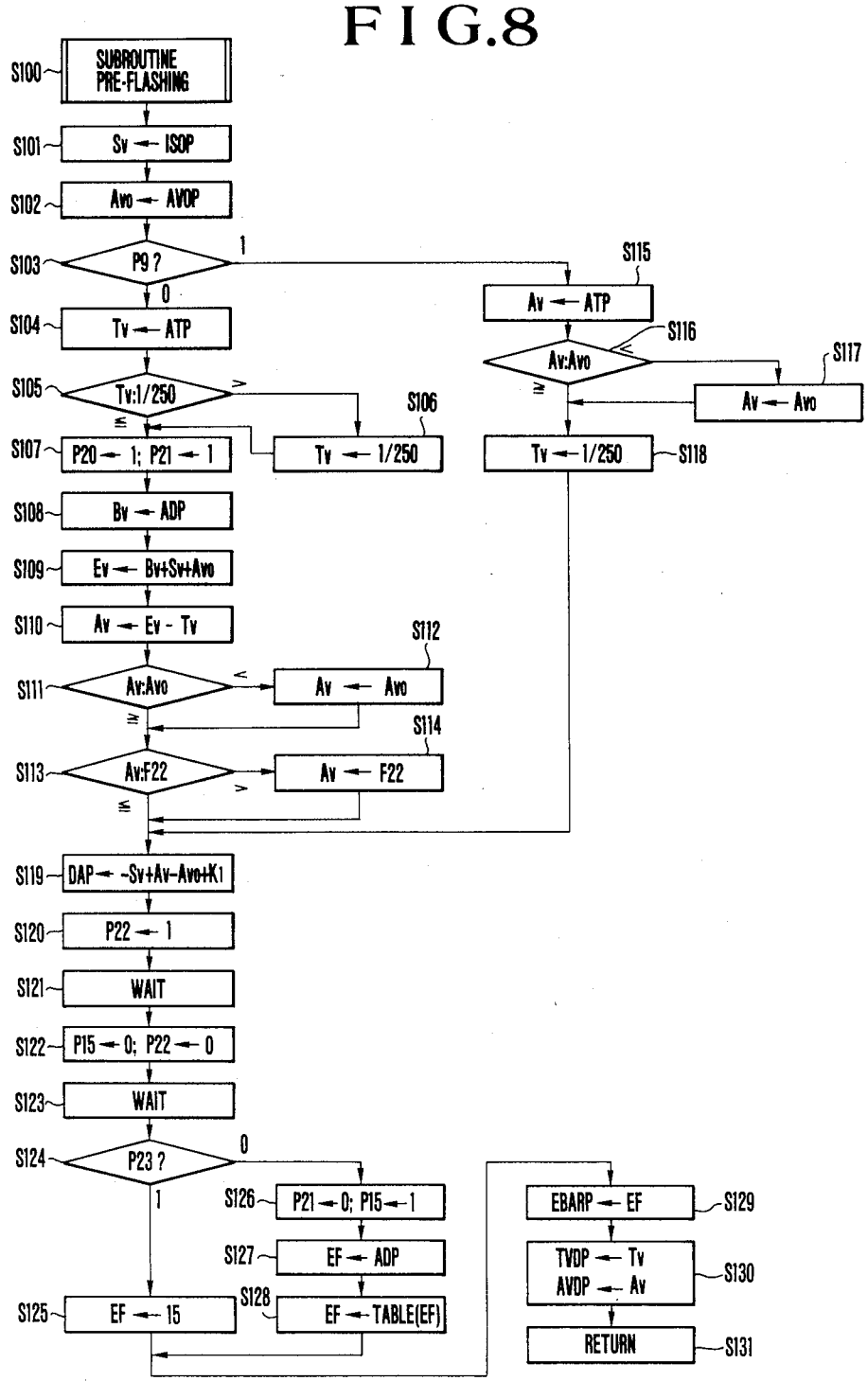
Figure 9:
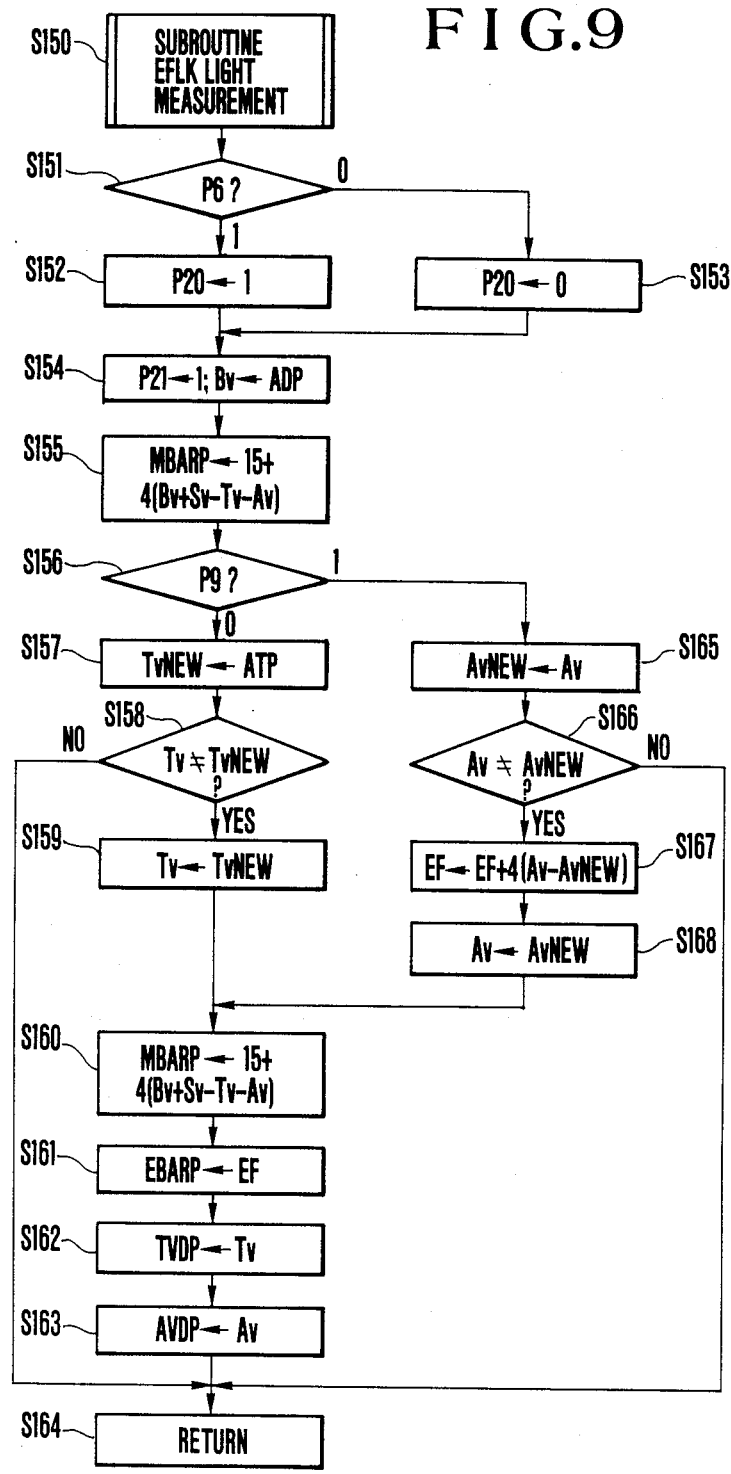

Referring now to FIG. 8, the pre-flashing subroutine is as follows:

Step S101: Sv←ISOP. This is an instruction to read the ISO sensitivity value from the ISOP into the register Sv. In response to this instruction, the CPU 60 produces the data "00H" to the address bus AB. Then, the decoder 89 brings the level of the output CS0 up to a high level. As a result, the bus buffer 62 for the ISO sensitivity setting switches 63 to 70 is selected. Next, the voltage of a terminal RD of the CPU 60 is pulled down to a low level for a predetermined period of time. Therefore, the bus buffer 62 which is selected by the decoder 89 supplies the data of the switches 63 to 70 to the data bus DB. The CPU 60 reads in the data of the data bus DB at the timing of a rise in the low level signal applied to the terminal RD. The setting value of the ISO sensitivity is thus read in and stored at the register Sv.

Step S102: Avo←AVOP. This calls for reading the maximum open aperture value of the lens from the AVOP into the register Avo. A process similar to the step S101 is performed accordingly.

Step S103: P9? The instruction is to detect the state of an input port P9. In response to this, the port P9 is checked to find whether the camera is in the shutter priority photographing mode or the aperture priority photographing mode. If the switch SW9 is on, the shutter priority mode is selected. In that case, the flow of operation proceeds to a step S104. If the switch SW9 is off, the camera is set in the aperture priority mode. The flow of operation, in that event, branches out to a step S115. First, in the case of the shutter priority photographing mode, the operation is performed in the following manner:

Step S104: Tv←ATP. The instruction calls for reading a shutter time value from ATP into the register Tv. A process is carried out in a manner similar to the steps S101 and S102.

Step S105: Tv: 1/250. This instructs to compare the content of the register Tv with a flash synchronizing time 1/250 sec. The instruction of a step S106 is carried out, if a preset shutter speed is higher than the flash synchronizing speed which is, for example, 1/250 sec. The instruction of another step S107 is carried out if the preset speed is lower than the synchronizing speed.

Step S106: Tv←1/250. In response to this, the content of the register Tv is replaced with some data corresponding to the flash synchronizing shutter speed 1/250 sec., so that a flash photographing operation can be performed at a shutter speed not exceeding the synchronizing speed. Further, in case that the preset shutter speed is slower than the speed 1/250 sec., an exposure is carried out at that shutter speed at the step S105. In that event, this instruction is skipped.

Step S107: P20←1; P21←1. In response to this instruction, a high level signal is produced from a output port P20 to close thereby the switch 106; and another high level signal is produced from a port P21 to close the switch 113 and to open the switch 114. At this point of time, the shutter release button has not been pushed to the second step of stroke as yet. The camera is, therefore, in a state as shown in FIG. 4b. The light of the object coming through the photo-taking lens 402 is reflected by the mirror 408 to be turned into an erecting image, which is visible by the photographer through the eyepiece 406.

Further, under this condition, a portion of the light from the object is incident upon the light receiving elements 104 and 105. As mentioned in the foregoing with reference to FIG. 4a, the light receiving element 104 is arranged to receive the object light for the peripheral part of the photographing frame and the other light receiving element 105 to receive the light for the middle part of the frame.

With the instruction of the step S107 carried out, the switch 106 is closed to parallel connect the light receiving elements 104 and 105. The logarithmic compression circuit consisting of the operational amplifier 107 and the diode 108 produces a logarithmically compressed value representing a measured average luminance of the whole photographing frame.

As described in the foregoing with reference to FIG. 4a, the output of the operational amplifier 107 is inverted and its gain level is adjusted through the operational amplifier 112 and the resistors 109, 110 and 111. The gain adjusted output is supplied to the A/D converter 90 via the switch 113 which is turned on with the instruction of the step S107 carried out.

Step S108: Bv←ADP. The CPU 60 reads the output of the A/D converter 90 into the register Bv thereof. In this instance, the data read into the register Bv is obtained by A/D (analog-to-digital) converter converting the luminance of the light received through the maximum aperture of the lens and the light receiving elements 104 and 105.

Step S109: Ev←Bv+Sv+Avo. The instruction means to add up the data of the registers Bv, Sv and Avo and to store the sum at another register Ev. Therefore, the data of film sensitivity and the maximum open F number are added to the measured light value.

Step S110: Av←Ev−Tv. The data of the register Tv is subtracted from the data of the register Ev. The result of subtraction is stored at the register Av. The data of the aperture value is obtained by subtracting the data of the shutter time value from the value Ev.

Step S111: Av: Avo.

Step S112: Av←Avo. In case that the computed aperture value obtained by the step S110 is an F number which is smaller than the value Avo, the steps S111 and S112 are carried out to change the data of the register Av into data corresponding to the maximum open aperture value.

Step S113: Av: F22.

Step S114: Av←F22. In case that the aperture value obtained by the step S110 is larger than a minimum aperture value, such as F 22, the steps S113 and S114 are carried out to store data corresponding to the minimum aperture F 22 at the register Av.

With the steps S104 to S114 carried out as described above, an aperture value in the shutter priority photographing mode is determined and stored at the register Av.

At the step S103, if the switch SW9 is off indicating selection of the aperture priority photographing mode, the operation comes to a step S115 from the step S103.

Step S115: Av←ATP. The data of the ATP is read into the register Av. With this instruction carried out, in the aperture priority photographing mode, the data from the switches 81 to 88 is read as a signal indicative of an aperture value.

Step S116: Av: Avo.

Step S117: Av←Avo. The instruction is identical with those of the steps S111 and S112. In the event of a preset aperture value of an F number smaller than the maximum aperture value, the instruction calls for changing the aperture to the maximum aperture.

Step S118: Tv←1/250. In the same manner as in the case of the step S106, the instruction calls for changing the shutter time to a synchronizing shutter speed.

With the steps S115 to S118 carried out, the shutter time and the aperture to be employed in the aperture priority photographing mode are determined and are respectively stored at the registers Tv and Av. In the shutter priority mode, the operation enables a photographing operation to be performed at an exposure apposite both to the external light and to the main object to be photographed. In the case of daylight synchronized flash photography or the aperture priority mode, the operation enables a flash photographing operation to be carried out at a desired aperture value.

Step S119: DAP←−Sv+Av−Avo+K1. A result of computation −Sv+Av−Avo+K1 (wherein K1 represents a constant) is produced at the port of DAP, i.e. the D/A converter 91 of FIG. 4a. Upon receipt of this data, the D/A converter 91 produces a voltage of Vc−(−Sv+Av−Avo+K1)×18 mV. The computing formula and the constant K1 will be described later in further detail at a step S122.

Step S120: P22←1. This means to produce a high level signal from a port P22. With this instruction carried out, the switch 97 of FIG. 4a is closed to have the two terminals of the capacitor 96 short-circuited.

Step S121: WAIT. This means waiting for a period of time until the electric charge of the capacitor 96 is discharged with the switch 97 turned on. With the electric charge of the capacitor 96 discharged, the inversion input of the comparator 99 becomes the voltage Vcc. This causes the comparator 99 to produce a low level signal. Accordingly, the levels of inputs to the OR gates 125 and 126 become low.

Step S122: P15←0, P22 ←0. A low level signal is produced from the port P15. The level of the terminal B drops. (The level of the port P15 has been high since the step S8). As mentioned in the foregoing, the flash device detects the drop of the level of the signal of the terminal B and begins to perform a pre-flashing action. The pre-flashing light is reflected by the main object. The reflection light from the main object passes through the photo-taking lens 402 as shown in FIG. 4b. The light passes through the half reflection mirror part of the mirror 408 and is reflected by the sub-mirror 409. The reflected light is condensed by the lens 410 and reaches the light receiving element 92. At the same time, the level of the port P22 becomes "0" and an integrating process begins. In that instance, the quantity of light incident on the light receiving element 92 is smaller than the quantity of light incident on the film surface due to a light quantity loss caused by the mirror 408, the lens 410, etc. For the sake of simplification of description, let us here assume that the quantity of light incident on the light receiving element 92 is ⅛ of the quantity of light incident on the film surface. As described in the foregoing with reference to FIG. 1, the pre-flash light quantity is 1/10 of the main flash light quantity. Further, the aperture of the lens is fully opened at the time of pre-flashing. Whereas, at the time of main flashing, the aperture is stopped down before main flashing. Therefore, in that instance, the light receiving element 92 is irradiated by a light quantity greater by $2^{Av-Avo}$.

An opposite exposure light quantity for a film of ISO sensitivity 100 can be approximately determined to be 0.1 lux·sec. The value of ISO 100 is thus reducible to an APEX value of 5. Hence, an opposite exposure light quantity for a film of an APEX value Sv becomes 0.1·lux sec.×$2^{(5-Sv)}$.

In performing a pre-flashing action, in order to produce the flashing stop signal at a pre-flashing light quantity which is 1/10 of the apposite exposure light quantity of main flashing, with the above-stated light quantity loss taken into consideration, the collector current Ice of the transistor 95 must be arranged to flow in sufficiently large quantity to satisfy the following relation to the photo current Ispc of the light receiving element 92:

$$Ice = 2^{(5-Sv)} \times 2^{(Av-Avo)} \times 8 \times 10 \times Ispc$$
$$= 2^{(5-Sv+Av-Avo+3+3.32)} \times Ispc$$

Therefore, the output of the D/A converter 91 becomes Vc−18 mV×(5−Sv+Av−Avo+6.32). With the constant K1 assumed to be 11.32, the digital input terminal N of the port of the D/A converter 91 receives a digital value corresponding to −Sv+Av−Avo+K1.

Since the above-stated conditions are satisfied with the step S119 carried out, in performing the pre-flashing action, the output level of the comparator 99 rises when the pre-flashing light quantity reaches a value 1/10 of an adequate main flashing light quantity required for an exposure apposite to the object. Then, the level of the signal of the terminal B changes from a low level to a high level, so that the pre-flashing action of the flash device can be brought to a stop as described in the foregoing with reference to FIG. 1. Then, the flash device has the pre-flashed light quantity stored at the latch circuit 22.

Step S123: WAIT. The operation of the CPU 60 remains dormant until the lapse of a sufficient period of time required for the above-stated pre-flashing.

Step S124: P23? This is an instruction to detect the flashing stop signal for stopping the pre-flashing action by detecting the output of the comparator 99 via the input port P23. If the output of the comparator 99 is "1", that is, if the flashing stop signal has been produced, the flow of operation proceeds to a next step S125. If not, it shifts to a step S126. Step S125: EF←15. With the flashing stop signal having been produced, this instruction is carried out by storing at a register EF the data "15" required for an adequate display.

Step S126: P21←0; P15←1. With the flashing stop signal having been not produced, a low level signal is produced from the output port P21. This causes the switch 113 to be turned off and the switch 114 to be turned on to have the output of the operational amplifier 103 supplied to the A/D converter 90. Further, since the flashing stop signal has not been produced, a high level signal is produced at the output port P15. This causes the signal level of the terminal B to rise and the flash device to store the flashed light quantity.

Step S127: EF←ADP. This is an instruction to have the voltage of the capacitor 96 to be stored at the register EF in the form of an A/D converted digital value.

Figures 12, 13:
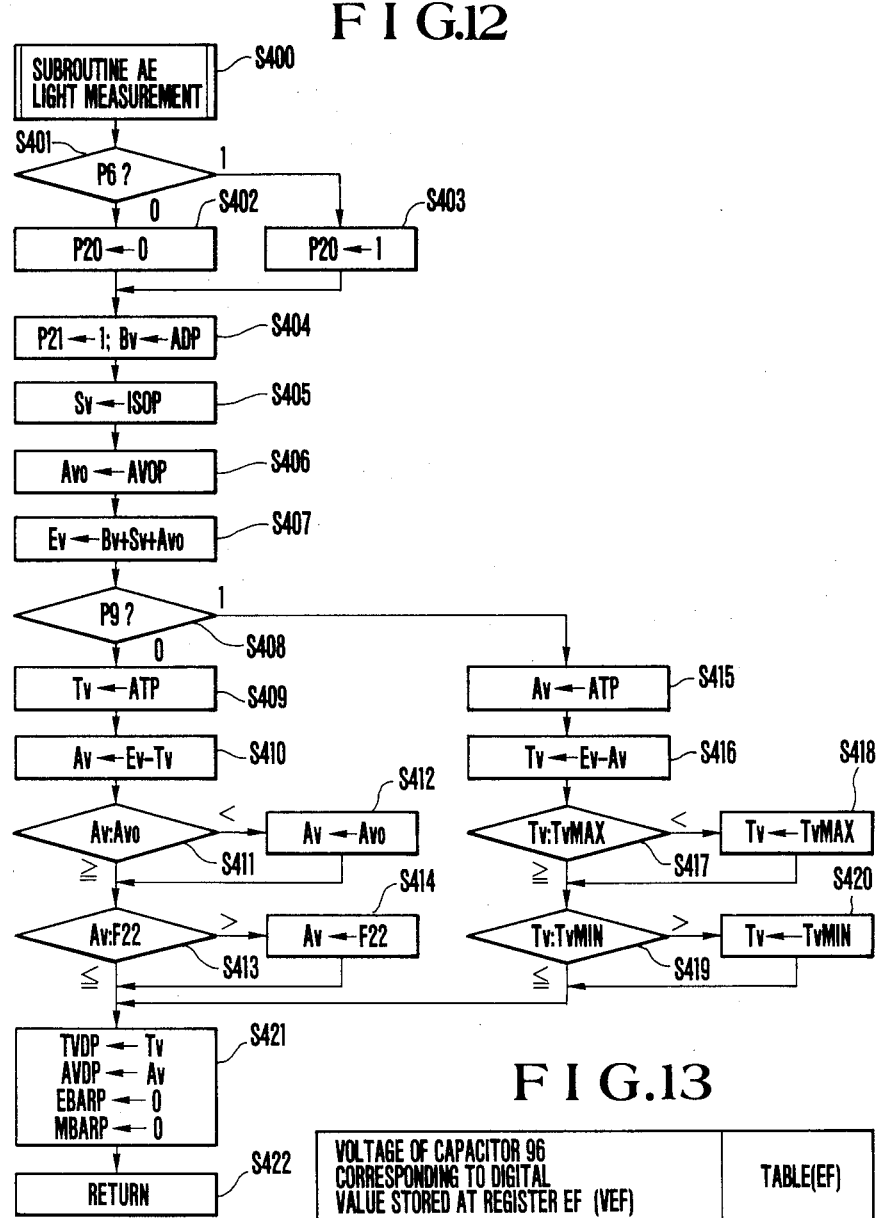

Step S128: EF←TABLE (EF). In response to this instruction, reference is made to a table TABLE provided on the ROM of the CPU 60 and one of values "1" to "15" which corresponds to the digital value stored at the step S127 is stored at the register EF. Referring to FIG. 13, the terminal voltage VEF of the capacitor 96 corresponding to the digital value stored at the register EF becomes, in the case of an apposite exposure, equal to a voltage VEFref with the latter assumed to be a voltage obtained at the time of the apposite exposure. Then, in that case, the table TABLE returns a value "15". In the event of an under-exposure by one step, the flash light quantity is ½ of the adequate flash light quantity and thus can be expressed as VEF=Vcc−½(Vcc−VEFref). In that event, the table TABLE returns a value "11". Accordingly, the content of the register EF becomes "15" in the case of an apposite exposure. It becomes "11" in the event of an under exposure by one step. In this manner, the content of the register EF decreases by "4" every time the degree of under-exposure further increases step by step. In the absence of any flash light quantity, the terminal voltage VEF of the capacitor 96 is equal to the voltage Vcc and the table TABLE returns a value "1".

Step S129: EBARP←EF. In response to this instruction, the content of the register EF is supplied to the LCD display part 200. The LCD display part 200 then makes a display of the result of pre-flashing to provide the photographer with a prediction of an apposite exposure or a degree of under-exposure. As mentioned above, at the step S128, the content of the register EF is "15" in the case of an apposite exposure; "11" in the case of an under-exposure by one step; and "7" in the case of an under-exposure by two steps.

Step S130: TVDP←Tv; ADVP←Av. In response to this instruction, data is supplied to the LED display part 300. The LED display part 300 then displays the currently set values of the shutter time and the aperture.

Step S131: RETURN. The flow of operation comes to a main routine.

Step S12: CCCF←1. In response to this instruction, "1" is erected at the flag CCCF to indicate thereby selection of the EFLK mode. In effecting an exposure by allowing the shutter curtains to travel, the state of this flag is detected. In the case of "1", the CPU 60 makes the output level of the output port P16 low. This in turn makes the level of the terminal D low to permit the flash device to flash.

Step S13: EFLK light measuring subroutine This subroutine is for measuring and making a display of external light prior to an exposure. The purpose of this is to simplify a daylight synchronized flash photographing operation by showing the luminance of daylight under the EFLK mode condition. The details of the EFLK light measuring subroutine are as described below with reference to the flow chart of FIG. 9:

Step S151: P6? This means to detect the state of the input port P6. By this, the state of the light measuring mode selection switch SW6 is detected. If the switch is on, the operation shifts to a step S153. If it is off, the operation proceeds to a step S152. The electronic switch 106 is operated to shift photometric sensitivity distribution.

Step S152: P20←1. A high level signal is produced from the output port P20 to close the switch 106 to select thereby a center-weighted averaging light measuring mode.

Step S153: P20←0. A low level signal is produced from the output port P20. This opens the switch 106 to select a spot light measuring mode.

Step S154: P21←1; Bv←ADP. A high level signal is produced from the output port P21. This turns on the switch 113 and turns off the switch 114. A measured value of light which is the output of the operational amplifier 107 is converted by the A/D converter into a digital value, which is stored at the register Bv.

Step S155: MBARP←15+4 (Bv+Sv−Tv−Av). The values of the shutter time and the aperture which have been obtained by the pre-flashing subroutine (as a result of the center-weighted averaging light measurement performed with the switch 106 closed as described at the step S107) and stored at the registers Tv and Av are subtracted from a measured light value which is the sum of the ISO sensitivity value Sv and the luminance value Bv of the object obtained by carrying out the step S154. As mentioned in the foregoing with reference to FIG. 5a, the LCD display is arranged to be made on the unit of ⅛ step. Therefore, the computation is carried out with multiplication by 4. If the shutter time value and the aperture value which are currently set are underexposing values as compared with the measured light value, the content of the MBARP becomes smaller than the value "15". In this instance, the decoder 203 of FIG. 5a makes a display on the unit of ¼ step within the view finder showing a mark □ which indicates whether the currently set shutter time and aperture values are apposite to the external light at a part lower than a mark ▷ which is indicative of an apposite exposure. Further, in case where the result of a pre-flashing action indicates that the object can be adequately photographed by performing a main flashing action, a mark ◁ which is indicative of the result of a pre-flashing action comes to the same height as the above-stated mark ▷ as shown in FIG. 4d. In the event of the result of a pre-flashing action predicting an under-exposure, the mark ◁ indicative of the result of the pre-flashing action comes below the mark ▷. Meanwhile, the shutter time and aperture values are displayed in the lower part of the view finder by the LED display part 300.

Step S156: P9? The instruction is carried out in exactly the same manner as in the case of the step S103. A discrimination is made between the shutter priority mode and the aperture priority mode. In the case of the shutter priority mode, the flow of operation proceeds to a step S157.

Step S157: TvNEW←ATP. A shutter time setting value is read.

Step S158: Tv≠TvNEW? A discrimination is made to find whether the setting value has changed or not after pre-flashing. The embodiment permits to change the shutter time value after pre-flashing to adjust the degree of exposure to the flash light and, accordingly, also the degree of exposure to the external light. In such a case as shown in FIG. 4d, therefore, both the exposure to the external light and the exposure to the flash light can be adequately adjusted by adjusting the setting value of shutter speed to a slower speed in such a way as to have the mark □ shifted upward to the same height as the mark ▷.

Step S159: Tv←TvNEW. To have a new shutter time value stored, the value of a register TvNEW is transferred to the register Tv.

Step S160: MBARP←15+4(Bv+Sv−Tv−Av). A measured value of the external light is displayed in the same manner as in the case of the step S155.

Step S161: EBARP←EF. The result of pre-flashing performed by the flash device is displayed.

Step S162: TvDP←Tv.

Step S163: AvDP←Av. The shutter time and aperture values are displayed. Further, in the case of the aperture priority photographing mode:

Step S165: AvNEW←Av.

Step S166: Av≠AvNEW? The setting value of aperture is checked to find whether it has changed. If not, the flow of operation of the CPU 60 comes back to the step S164 of the main flow shown in FIG. 7.

Step S167: EF←EF+4(Av−AvNEW). In the case of the aperture priority mode, a change in the aperture setting value results in a change in the exposure light quantity to be obtained by flashing. In the event of a display indicating an under-exposure by one step, for example, since the flash quantity of the flash device is stored, an adequate light quantity can be obtained by opening the aperture to make it wider by one step. Accordingly, the display indicative of the result of pre-flashing also changes to the same degree as the change in the aperture value.

Step S168: Av←AvNEW. The aperture setting value is stored. The exposure light quantity obtainable by the flashing action of the flash device is adjustable as desired by this process. After the adjustment, the display is made in the same manner as in the case of the shutter priority photographing mode.

Step S164: RETURN. The flow of operation comes back to the main routine.

Step S14: P8? The state of the input port P8 is detected to find the state of the switch SW8 which is shown in FIG. 4a. If the switch SW8 is found in its ON position, the flow of operation branches out to the step S2. In other words, the EFLK mode is cancelled. As a result, if the instruction of the step S6 is to be carried out, a hight level signal is produced from the output port P19 to turn on the transistor 130. This lowers the potential of the terminal E. The output level of the operational amplifier 46 of FIG. 1 shifts from a low level to a high level to clear the latch circuit 22. If the switch SW8 has not been turned on, the flow of operation proceeds to a step S15.

Step S15: P2? The state of the switch SW2 is detected through the state of the input port P2. If the switch SW2 has been turned on by the second step of stroke of the shutter release button, the instruction of a step S25 is carried out. If the switch SW2 is off, the EFLK light measuring subroutine is repeated. Therefore, in that event, the LCD display indicative of the external light varies according to any change in the luminance of the external light. Further, the display of the exposure light obtainable by means of the flash device varies with any change in the aperture setting value. When desired values of the aperture, the shutter time and the exposure flash light are judged to have been obtained, the photographer pushes the shutter release button to the second step of stroke thereof. This causes the switch SW2 to turn on. Then, the step S25 for an exposure subroutine is carried out. The details of the exposure subroutine are as described below with reference to the flow chart of FIG. 10:

Step S201: P13←1. A high level signal is produced from the output port P13. As a result, the transistor 117 turns on to energize the magnet 116. The camera is released from a first clamped state. Accordingly, a sequence of input processes which are not shown begins for effecting an exposure.

Step S202: P12←1. A high level signal is produced from the output port P12. The transistor 119 is turned on to energize the magnet 118. This is an instruction for performing aperture control.

Step S203: WAIT. The operation is suspended until the lapse of a period of time required for cancellation of the first clamped state of the camera.

Step S204: P13←0. The output level of the output port P13 is changed from a high level to a low level. This turns off the transistor 117 to cut off the power supply to the magnet 116.

Step S205: Avc←Av−Avo. The data of the register Avo is subtracted from the data of the register Av. The result of subtraction which is data representing the number of stopping down steps is stored at the register Avc.

Step S206: Avc=0? If the data of the register Avc is "0", the flow of operation branches out to a step S210. With the step S210 carried out, the magnet 118 is inhibited from being energized. The aperture stopping down process is brought to a stop Step S207: P7? The state of the input port P7 is detected. If the switch SW7 is off and is at a high level, the step S207 is repeated until the switch SW7 turns on and becomes a low level.

Step S208: P7? This is, contary to the setp S207, an instruction to wait until the output level of the switch SW7 becomes a high level. Therefore, at these steps S207 and 208, the operation in suspended until the aperture is stopped down by one step with the switch SW7 turned on and off in response to the stopping down action on the aperture.

Step S209: Avc←Avc−1. After "1" is subtracted from the data of the register Avc, the operation jumps to the step S206. The steps 206 to S209 thus form a routine, wherein the operation waits while the switch SW7 turns on and off a number of times corresponding to a number of steps by which the aperture is stopped down. When the data of the register Avc becomes "0" with this routine having been carried out, the flow of operation branches out from the step S206 to a step S210.

Step S210: P12←0. A low level signal is produced from the output port P12 to turn off the transistor 119. The magnet 118 is deenergized to bring the aperture stopping down action to a stop. The aperture of the lens is thus stopped down to a position corresponding to the data stored at the register Av.

Step S211: P22←1. A high level signal is produced from the output port P22 to close the electronic switch 97. The electric charge of the capacitor 96 is thus discharged.

Step S212: P15←1.

Step S213: P16←1. High level signals are produced from the output ports P15 and P16 to raise the levels of the terminals B and D up to a high level. As mentioned in the foregoing at the step S126, a high level signal has already been produced at the output port P15. However, the step S212 is provided for the purpose of carrying out the exposure subroutine without carrying out the pre-flashing subroutine.

Step S214: CCCF? The state of the flag CCCF is sensed. In case that the flag CCCF is at "0" and the camera is not in the EFLK mode but is, for example, in an AE (automatic exposure) mode, a step S217 is carried out. In the flow of operation which has been described above, the flag CCCF is at "1" and the camera is in the EFLK mode. Therefore, in this instance, the flow of operation shifts to a step S226.

Step S226: P17? The state of the input port P17 is sensed. In case that the switch 50 of the flash device is off and the leading shutter curtain synchronizing mode is selected, the flash device is having only 250 μA through the terminal E in this instance. Under that condition, the input port P17 is at a low level and a step S215 is carried out. If the switch 50 is on and the camera is set in the trailing shutter curtain synchronizing mode, the flash device is having more than 800 μA via the terminal E. In that event, the level of the input port P17 becomes a high level and a step S227 is carried out.

Step S215: P16←0. A low level signal is produced from the output port P16. The level of the terminal D becomes low. Then, this causes via the inverter 40 the level of one of the inputs of the AND gate 33 to become high to permit flashing.

Step S216: P22←0. A signal 0 is produced from the port P22. The instruction is for starting TTL light control. In the case of the EF lock mode, however, the flash device stores a flashing light quantity. In other words, with the TTL light control having been performed, even if a flashing stop signal is produced to apply a pulse from the terminal D to the AND gate 47 of FIG. 1, the signal is ignored as the flip-flop 36 is in a set state.

Step S217: P11←1. A high level signal is produced at the output port P11 to turn on the transistor 121. The magnet 120 is energized to cause the leading shutter curtain to travel.

Step S218: WAIT. The CPU 60 waits until the lapse of a period of time required for causing the leading shutter curtain to begin to travel.

Step S219: P11←0. A low level signal is produced from the output port P11 to turn off the transistor 121. This brings the power supply to the magnet 120 to a stop.

Step S220: TIMER←Tv. The data of the register Tv is stored at the timer TIMER to effect real time extension for obtaining a shutter time.

Step S221: TIMER? The state of a timer flag TIMERF is continuously detected until the lapse of the shutter time. Upon completion of the travel of the leading shutter curtain, the X-contact 124 turns on to make the output level of the AND gate 33 of FIG. 1 high. The monostable multivibrator 32 produces a pulse to cause the trigger circuit 10 to begin to operate. The flash device begins to flash. As described in the foregoing with reference to FIG. 1, the flash device comes to stop flashing in response to the signal of the comparator 24 when it has flashed a quantity of light corresponding to a value stored at the latch circuit 22 at the time of pre-flashing. Therefore, the main object to be photographed can be adequately illuminated. After the lapse of the real shutter time, the flag TIMERF becomes "1". The CPU 60 then comes to carry out a step S222.

Step S222: P10←1. A high level signal is produced at the output port P10 to turn on the transistor 123. The magnet 122 is energized to cause the trailing shutter curtain to travel.

Step S223: WAIT. The operation of the CPU 60 is suspended for a period of time required before the trailing shutter cutain begins to travel.

Step S224: P10←0. A low level signal is produced from the output port P10. This causes the transistor 123 to turn off to bring the power supply to the magnet 122 to a stop.

Step S225: RETURN. The flow of operation comes back to the main routine shown in FIG. 7. Thus, a sequence of exposure effecting processes comes to an end including pre-flashing, storing and main flashing processes. Further, in the event that the trailing shutter synchronizing mode has been selected with the switch 50 turned on, a current of 800 μA is obtained from the terminal E as mentioned in the foregoing at the step S226. In that event, therefore, the output level of the comparator 134 becomes high. The input port P17 is thus at a high level. Therefore, the operation flow branches out from the step S226 to a step S227. The flow of operation to be carried out from the step S227 is as described below:
Step S227: P11←1.
Step S228: WAIT.
Step S229: P11←0.
Step S230: TIMER←Tv.
Step S231: TIMERF?

The instructions of these steps are identical with the steps S217 to S221.

The leading shutter curtain travels. The shutter time data stored at the register Tv is real time extended by the timer circuit TIMER. The shutter time is counted. After the lapse of the predetermined period of time, the steps S232 and S233 are carried out. Therefore, even when the X-contact turns on with the travel of the leading shutter curtain having come to an end, the level of the terminal D remains high. Accordingly, the output of the inverter 40 of FIG. 1 is at a low level. The flash device, therefore, does not perform any flashing operation.

Step S232: P16←10.
Step S233: P22←0. The instructions of these steps are identical with those of the steps S215 and S216. The level of the terminal D changes from a high level to a low level. The flash device flashes.

In case that the TTL light control mode is selected by the switch 55 of the flash device shown in FIG. 1 and the switch position is on the ground side, the flow of operation shifts to a step S16 in response to the instruction of the step S10. In that event, therefore, pre-flashing is never performed. With the position of the switch 55 on the ground side, or with pre-flashing not performed as yet, when the shutter release button is pushed down to the first step of stroke before pre-flashing, the switch SW1 turns on. Then, the flow of operation branches out to a step S17 in response to the instruction of the step S16. The flow of operation from the step S17 and thereafter is as follows:

Step S17: P19←0, P15←1, P16←1.
Step S18: P18? In the same manner as at steps S8 and S9, the flash device is checked to find whether it has been completely charged. If not, the flow of operation shifts to a step S21. If it has been completely charged, the flow of operation proceeds to a step S19. Since, in this instance, the flash device has been completely charged, the step S19 is carried out in the following manner:

Step S19: CCCF←1. At this step, "1" is erected at the flag CCCF.

Step S20: TTL light control subroutine The details of this subroutine are as described below with reference to FIG. 11:

Step S301: P9? The state of the input port P9 is detected to find the state of the switch SW9. By this, a discrimination is made between the shutter priority mode and the aperture priority mode. In the case of the shutter priority mode, the switch SW9 is on. The operation proceeds to a step S302 in that case.

Step S302: Tv←ATP. The data of shutter time obtained from ATP is stored at the register Tv.
Step S303: Tv: 1/250.
Step S304: Tv←1/250. If the shutter time value stored at the register Tv is larger than a maximum open time 1/250 sec., the shutter time is set at 1/250 sec. to prevent a slit exposure.

Step S305: P20←1, P21←1 A signal "1" is produced from the output port P20 to close the switch 106. The outputs of the light receiving elements 104 and 105 are put together for averaging light measurement. Further, "1" is produced from the port P21 to close the switch 113 and to open the switch 104.

Step S306: Bv←ADP. An averaged measured light value, i.e. the output of the operational amplifier 107 is A/D converted by the A/D converter 90 and is read in.

Step S307: Sv←ISOP.
Step S308: Avo←AVOP. The instructions of these steps S307 and S308 are identical with those of the steps S101 and S102. The data representing the ISO sensitivity and the maximum aperture value of the lens are respectively stored at the registers Sv and Avo.

Step S309: Ev←Bv+Sv+Avo.
Step S310: Av←Ev−Tv.
Step S311: Av: Avo.
Step S312: Av←Avo.
Step S313: Av: F22.
Step S314: Av←F22. The instructions of these steps are identical with those of the steps S109 to S114. The CPU 60 obtains an aperture value by performing computing operation on the ISO sensitivity value, the maximum aperture value of the lens, the luminance of the object and the setting value of shutter time. The computed aperture value is checked to find whether it is within the controllable range of camera. If it is found not within the range, it is automatically shifted to a value within the control range of the camera.

Step S321: DAP←Sv. The output of the D/A converter 91 is determined. When the film 402 is exposed to light with the shutter 404 opened while the mirror 408 is uplifted as shown in FIG. 4c, the quantity of light reflected by the surface of the film 402 and comes to the light receiving element 92 is considerably small. Assuming that the ratio of this light incident on the light receiving element 92 to the light quantity incident on the film surface is 1/32 and an apposite exposure light quantity is $2^{Sv-5} \times 0.1$ lux-sec., in order to produce a flashing stop signal when the apposite film exposing light quantity is obtained, the current produced from the light receiving element 92 must be multiplied by $32 \times 2^{Sv-5} = s^{Sv}$. Therefore, the content of the register Sv is produced at the port for the DAP.

Step S322: TvDP←Tv; AvDP←Av; EBARP←0; MBARP←0. At this step, the computed shutter time and the computed aperture value are displayed at the LED display part 300. Meanwhile, "00H" is supplied to the LCD display part 200 to inhibit it from making any display. In case that the flash device has been completely charged and the TTL light control mode and the aperture priority mode are selected, the flow of operation branches out from the step S301 to a step S315.

The flow of operation from the step S315 to S320 is as described below:

Step S315: Av←ATP.
Step S316: Tv←1/250. At these steps S315 and S316, the setting value of aperture is supplied from the ATP to the register Av to be stored there and the shutter time is set at 1/250 sec. Which is a synchronizing time.

Step S317: Sv←ISOP.
Step S318: Avo←AVOP. In response to the instructions of the steps S317 and S318, the ISO sensitivity data is supplied from the ISOP to the register Sv to be stored there while the maximum aperture data of the lens is supplied from the AVOP to the register Avo to be stored there.

Step S319: Av:Avo.

Step S320: Av←Avo. The instructions of these steps S319 and S320 are identical with those of the steps S111 and S112. The aperture setting value is controlled to prevent it from becoming smaller than the maximum aperture value.

The TTL light control subroutine is carried out in the manner as described above. Following that, the flow of operation comes to a step S23 and the TTL light control is accomplished according to the exposure subroutine of the step S25.

Step S23: P2? The state of the switch SW2 is detected by checking the state of the input port P2. By this, it is found whether or not the shutter release button has been pushed down to the second step of its stroke. If the switch SW2 is found not having been turned on, a loop of the steps S7-S16-S17-S18-S19-S20-S23 is repeatedly carried carried out. The exposure subroutine of the step S25 is carried out when the switch SW2 is turned on. In this subroutine, if the EFLK mode has been selected, the instruction P22←0 of the step S216 is carried out to turn off the switch 97. An integrating action begins on the photo current generated by the light receiving element 92. Then, even if the comparator 99 produces a flshing stop signal from the terminal D, the stopping signal is not accepted and no flash stopping action is performed in that instance, because: Prior to this subroutine, the flip-flop 36 of FIG. 1 has been set by preflashing. The inversion output $\overline{Q}$ of the flip-flop 36 is therefore at a low level. The output of the switch 55 is at a high level and, through the inverter 38, it results in a low level output of the OR gate 39. As a result, the output of the AND gate 47 remains at a low level. Whereas, in the case of TTL light control, since the TTL light control mode is selected by means of the switch 55, the output of the OR gate 39 is at a high level. Therefore, the current resulting from the light incident upon the light receiving element 92 is expanded by $2^{Sv}$ times at the transistor 95 which has the output voltage of the diode 93, the operational amplifier 94 and the D/A converter 95 applied to the emitter thereof. The capacitor 96 is charged with this output of the transistor 95. Then, the flashing stop signal produced from the comparator 99 is transmitted via the AND gate 47 to the control circuit 12. This stops the xenon tube 11 from flashing.

The rest of the flow of operation is carried out in the same manner as described in the foregoing.

In the case described above, as mentioned in the beginning, the power supply switch 2 of the flash device of FIG. 1 has already been turned on before the power supply from the power supply circuit of the camera which is not shown is switched on and thus the capacitor 4 has been completely charged. Whereas, in case where the capacitor 4 has not been completely charged before the power supply of the power supply circuit of the camera is switched on, the flow of operation becomes as described below:

The operation at steps S1 to S7 and S16 to S18 is performed in the same manner as described in the foregoing:

Step S18: P18? In the case described in the foregoing, when the main capacitor 4 of the flash device has been completely charged, the output level of the comparator 7 becomes high; the transistor 51 turns on; a current is pulled into the flash device via the terminal E; the voltage output of the operational amplifier 128 increases; the output level of the comparator 135 becomes high; and the level of signal coming to the input port P18 becomes high to cause thus the flow of operation to branch out to the step S19. Whereas, in the event that the main capacitor 4 has not been completely charged as yet, the transistor 51 is off and no current is pulled in from the terminal E. The output of the comparator 135 remains at a low level. Accordingly, the signal coming to the input port P18 is at a low level. Therefore, the flow of operation, in this case, branches out to a step S21.

Step S21: CCCF←0. At this step, "0" is stored at the flag CCCF and selection of the AE mode is stored.

Step S22: AE light measuring subroutine. At this step, the CPU performs a subroutine of light measurement for AE (automatic exposure). The details of the AE light measuring subroutine are as described below with reference to FIG. 12:

step S401: P6?
Step S402: P20←0.
Step S403: P20←1.

These instructions of steps S401, S402 and S403 are identical with those of the steps S151, S152 and S153. The output level of the output port P20 is shifted for selection between averaging light measurement and spot light measurement according to the position of the switch SW6.

Step S404: P21←1; Bv←ADP. These instructions are the same as those of the step S154. A high level signal is produced from the output port P21 to turn on the switch 113; to turn off the switch 114; and to supply the measured light output to the A/D converter 90. The result of the A/D conversion is read into the register Bv.

Step S405: Sv←ISOP.
Step S406: Avo←AVOP.
Step S407: Ev←Bv+Sv+Avo.

these instructions are identical with those of the steps S101, S102 and S109. The ISO sensitivity data and the maximum lens aperture data are respectively stored at the registers Sv and Avo. An Ev value (exposure value) is obtained by adding these data together.

Step S408: P9? This is the same instruction as at the step S103 of FIG. 8. The flow of operation is shifted according to the state of the switch SW9 which is provided for selection of the priority photographing mode.

Step S409: Tv←ATP.
Step S410: Av←Ev−Tv.
Step S411: Av:Avo.
Step S412: Av←Avo.
Step S413: Av:F22.
Step S414: Av←F22.

These instructions are identical with those of the steps S104 and S110 to S114 which are shown in FIG. 8. At the step S409, the shutter time data is read from the ATP into the register Tv. At the step S410, an aperture value is obtained from the data stored at the registers Ev and Tv. The aperture value data thus obtained is stored at the register Av. At the steps S411, S412, S413 and S414, the aperture value Av is changed to a minimum aperture F22 when it is larger than the minimum aperture value F22 and to a maximum aperture Avo if it is smaller than the maximum aperture value. After that, the flow of operation comes to a step S421. In the event of the aperture priority mode, the operation branches out from the step S408 to a step S415.

Step S415: Av←ATP.
Step S416: Tv←Ev−Av.
Step S417: Tv: TvMAX.
Step S418: Tv←TvMAX.

Step S419: Tv:Tv MIN.
Step S420: Tv←TvMIN.

At the step S415, the aperture setting value is read from the ATP into the register Av. At the step S416, a shutter time value is computed and stored at the register Tv. At the steps S417 and S418, the shutter time is changed to a maximum shutter speed TvMAX (1/4000 sec. for example) if it is faster than the maximum shutter speed and to a minimum shutter speed TvMIN if it is slower than the minimum speed.

Step S421: TVDP←Tv, AVDP←Av, EBARP←0, MBARP←0. These instructions are the same as those of the step S322. The shutter value Tv and the aperture value Av are supplied to the latch circuits 301 and 302 of the LED display part 300 to have the setting values and the computed values displayed within the view finder. Meanwhile, the LCD display part 200 is not allowed to make any display by supplying "0" to the EBARP and MBARP. Further, while the switch SW1 remains on with the shutter release button continuously pushed to the first step of stroke, the CPU 60 keeps on repeating a loop of steps S7-S16-S17-S18-S21-S22-S23. During this repeating process, if the release button is pushed further down to the second step of stroke, the switch SW2 turns on and the exposure subroutine of the step S25 the details of which is shown in FIG. 10 is carried out.

Figure 10:
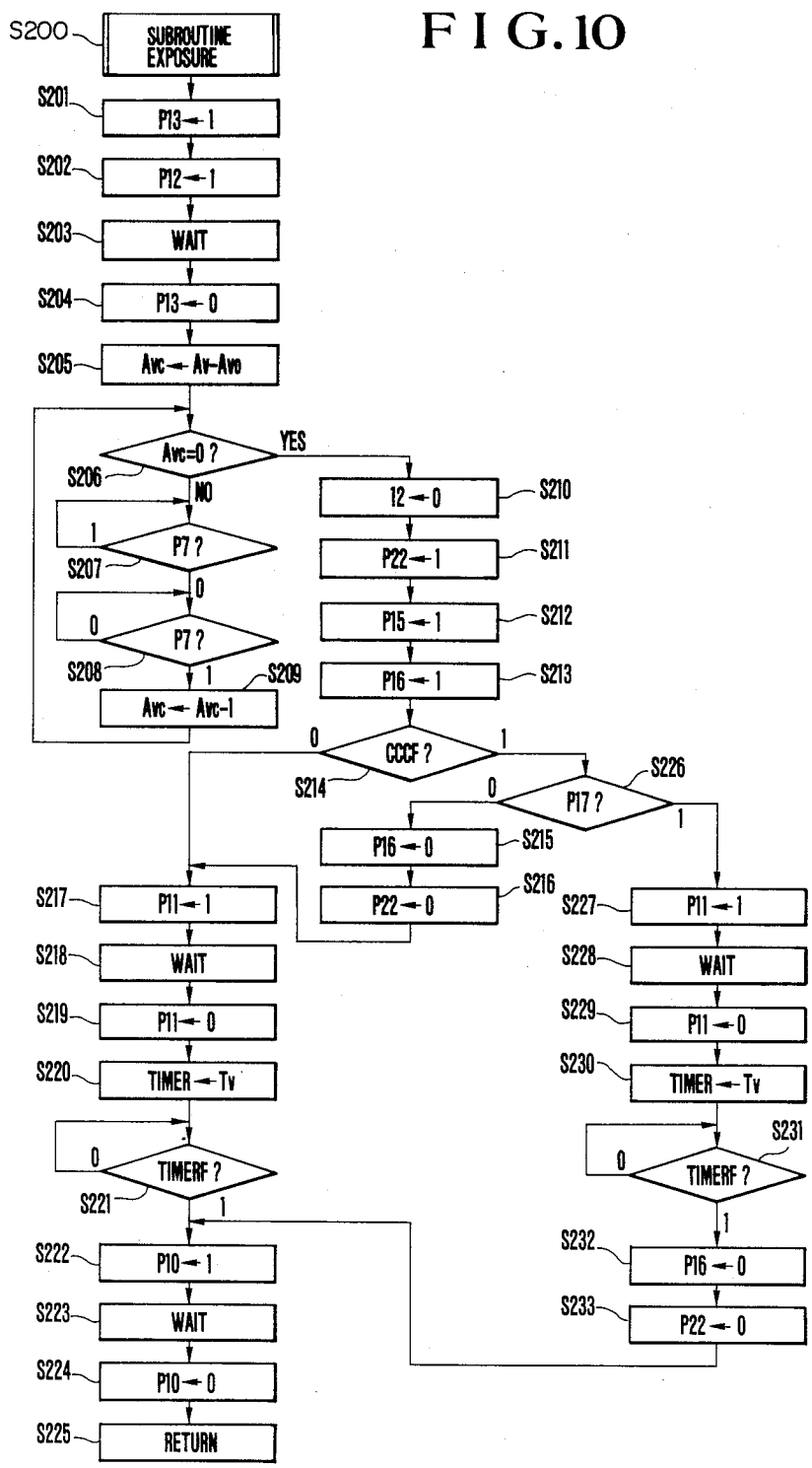
Figure 11:
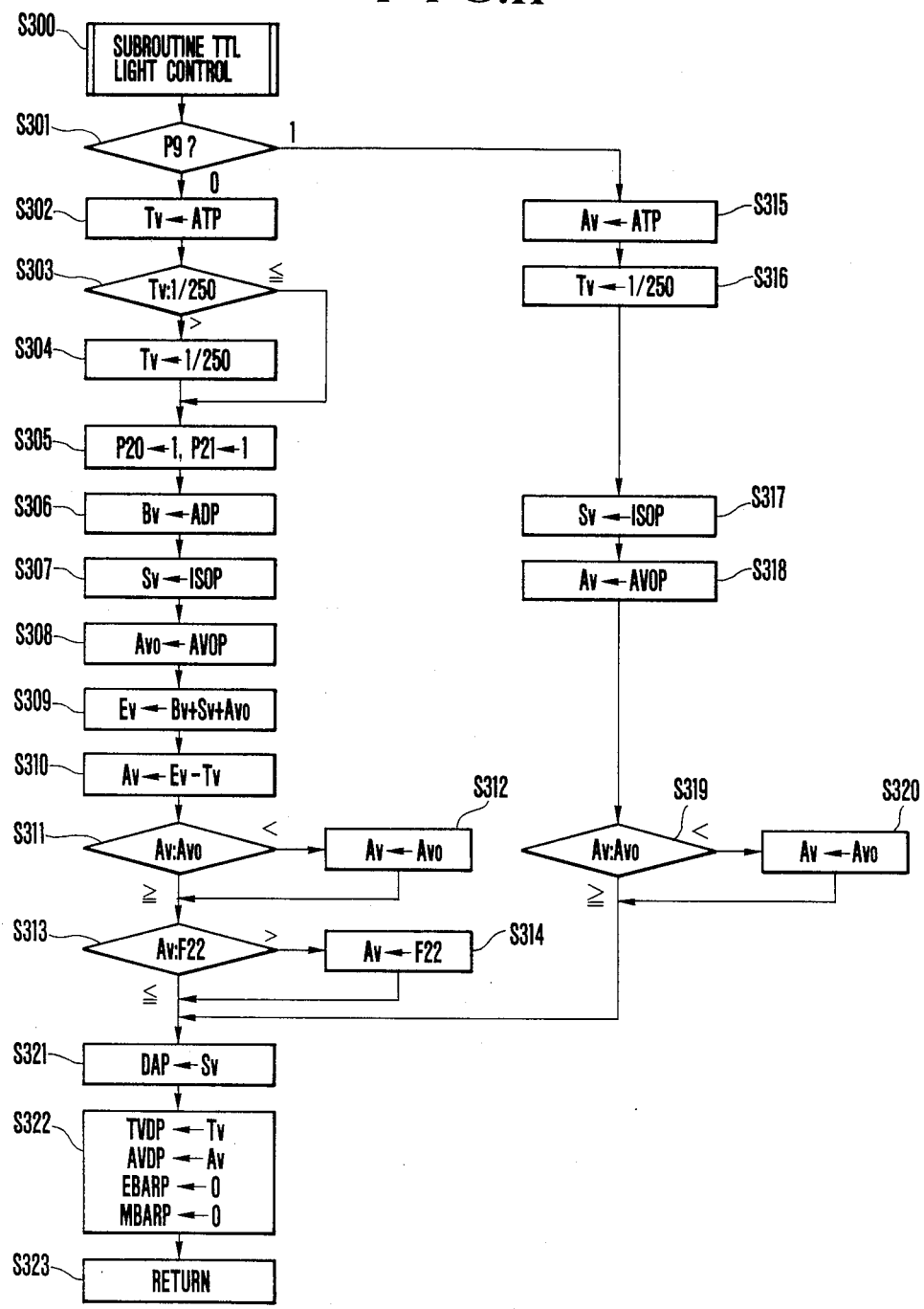

In the exposure subroutine of FIG. 10, the first clamped state of the camera is cancelled and the aperture control is performed at steps S201 to S213.

Step S214: CCCF? The state of the flag CCCF is detected. However, since "0" has been inserted at the step S21, the flow of operation shifts to a step S217. Shutter control is performed at steps S217 to S224. In this instance, since the output level of the output port P16 stays high, the level of the terminal D remains at a high level. Therefore, the flash device does not flash even if the X-contact turns on. Therefore, even if the flash device comes to be completely charged before the end of a sequence of release processes of the camera, any accidental flashing action of the flash device never be performed at a shutter time value under the AE control.

As apparent from the foregoing description, this invention advantageously permits various flash photographing operations including daylight synchronized flash photographing, etc.

What is claimed is:

1. A camera system including a flash device and a camera, comprising:
    (a) means for causing said flash device to perform pre-flashing prior to commencement of an exposure;
    (b) a computing circuit arranged to detect the quantity of a reflection light coming from a photographing object as a result of said pre-flashing, to determine whether said reflection light quantity has reached an adequate flash light quantity required for an apposite exposure and, if not, to obtain a degree of difference between said detected quantity and said adequate flash light quantity; and
    (c) a display circuit arranged to display on the basis of the output of said computing circuit a prediction of an adequate exposure light quantity when said detected light quantity becomes said flash light quantity required for an apposite exposure and to display a state of deviation when said degree of difference is obtained.

2. A camera system including a camera and a flash device, comprising:
    (a) a first light measuring circuit arranged to measure light through a photo-taking lens;
    (b) a second light measuring circuit arranged to measure the light of pre-flashing performed by said flash device prior to photographing;
    (c) a first integrating circuit arranged to integrate the output of said second light measuring circuit;
    (d) a second integrating circuit arranged to integrate the output of said first light measuring circuit which is arranged to measure a reflection light coming from a photographing object as a result of said pre-flashing;
    (e) a storage control circuit arranged to cause the integration value of said first integrating circuit to be stored and held when the output of said second integrating circuit reaches a predetermined value;
    (f) a flash light quantity control circuit arranged to control, on the basis of the stored integration value, main flashing to be performed for photographing;
    (g) a manual operation member; and
    (h) reset means for resetting said stored integration value by operating said manual operation member.

3. A camera system according to claim 2, wherein said manual operation member is provided on said camera.

4. A camera system including a camera and a flash device, comprising:
    (a) a first light measuring circuit arranged to measure light through a photo-taking lens;
    (b) a second light measuring circuit arranged to measure the light of pre-flashing performed by said flash device prior to photographing;
    (c) a first integrating circuit arranged to integrate the output of said second light measuring circuit;
    (d) a second integrating circuit arranged to integrate the output of said first light measuring circuit which is arranged to measure a reflection light coming from a photographing object as a result of said pre-flashing;
    (e) a storage control circuit arranged to cause the integration value of said first integrating circuit to be stored and held when the output of said second integrating circuit reaches a predetermined value;
    (f) a flash light quantity control circuit arranged to control, on the basis of the stored integration value, main flashing to be performed for photographing; and
    (g) indicating means for giving a warning in the event that the output of said second integrating circuit has failed to reach said predetermined value.

5. A camera system including a camera and a flash device, comprising:
    (a) detecting means for detecting the travel of a leading shutter curtain;
    (b) signal forming means for producing a signal after the lapse of a predetermined period of time from commencement of the travel of said leading shutter curtain;
    (c) a trigger control circuit operating in a first trigger mode in which said trigger control circuit triggers said flash device in response to the output of said detecting means and in synchronism with the travel of said leading shutter curtain and in a second trigger mode in which said circuit triggers said flash device when said circuit detects both the output of said detecting means and said signal produced from said signal forming means; and (d) selecting means for selection between said first and second trigger modes.

6. A camera system including a camera and a flash device, comprising:
   (a) detecting means for detecting the travel of a leading shutter curtain;
   (b) signal forming means having a first mode in which said means produces a signal before completion of the travel of said leading shutter curtain and a second mode in which said means produces a signal after completion of the travel of said leading shutter curtain;
   (c) a trigger circuit arranged to trigger said flash device according to the AND of the output of said detecting means and the signal of said signal forming means; and
   (d) selecting means for selection between said first and second modes.

7. A camera system including a camera and a flash device, comprising:
   (a) detecting means for detecting the travel of a leading shutter curtain;
   (b) a time counting circuit arranged to count a length of time corresponding to a shutter time value;
   (c) a first trigger control circuit having a first trigger mode for triggering said flash device in response to an output of said detecting means and in synchronizm with the travel of said leading shutter curtain, and a second trigger mode for triggering said flash device when both an output of said detecting means and an output of a signal outputted from said time counting circuit when the time counting by said time counting circuit is completed, are detected; and
   (d) a second trigger control circuit having a first trigger mode in which said second trigger control circuit causes a trailing shutter curtain to travel after completion of the time counting operation of said time counting circuit and a second trigger mode in which said second trigger control circuit causes said trailing shutter curtain to travel after a trigger action.

8. A camera system consisting of a flash device and a camera, comprising:
   (a) means for causing said flash device to perform a pre-flashing prior to commencement of an exposure;
   (b) a detecting circuit for receiving a pre-flashing light reflected from an object to be photographed and detecting an amount of light received; and
   (c) display means for displaying the relation of said amount of light received as detected by said detecting circuit to a predetermined value representing an appropriate exposure value.

9. A camera system according to claim 8, wherein said system further comprises computing means for computing a differences between said amount of light received as detected by said detecting circuit and said predetermined value and said display means is arranged to display a deviation from an appropriate exposure value according to the difference obtained by said computing means.

10. A camera system consisting of a flash device and a camera, comprising:
    (a) pre-flashing means arranged to make a pre-flashing prior to a photographing:
    (b) detecting means for detecting a light quantity of a pre-flashing as reflected from an object to be photographed;
    (c) computing means for computing whether an appropriate exposure can be obtained or not based on said reflected light quantity detected by said detecting means, said computing means having an aperture value information set by aperture setting means which sets an aperture inputted thereinto and computing the relation of a first exposure value determined based on the set aperture value information and said reflected light quantity detected as mentioned above to the appropriate exposure value; and
    (d) display means arranged to make a display based on a computation result of said computing means; whereby said first exposure value changes when the set aperture value is changed by the aperture setting means after the pre-flashing, and the relation of said first exposure value to an appropriate exposure value with thus changed aperture value is displayed.

11. A camera system according to claim 10, wherein said computing means computes a difference between said first exposure value and the appropriate exposure value and said display means is arranged to make a display to represent said difference.

12. A camera system according to claim 11, wherein said camera is an aperture priority exposure control camera.

13. A camera system consisting of a flash device and a camera which has a first flashing mode for making a pre-flashing prior to commencement of an exposure and determining and memorizing, beforehand, a flash light quantity at a time of a main flashing based on a result of said pre-flashing, then directly monitoring a flash tube when the main flashing is made by a release action, thus making a flash light irradiation onto an object to be photographed until the monitored flash light quantity reaches a value corresponding to said memorized flash light quantity, and a second flashing mode for adjusting a flash light quantity without making a pre-flashing, comprising:
    (a) selecting means for selecting said first or second flashing mode;
    (b) an operating member arranged to make a pre-flashing;
    (c) pre-flashing means for making said pre-flashing;
    (d) first control means for effecting a flash light exposure control under said first flashing mode;
    (e) second control means for effecting the flash light exposure control under said second flashing mode; and
    (f) operation regulating means for actuating said pre-flashing means in response to an actuation of said operating member under a state in which said first flashing mode has been selected by said selecting means and allowing said first control means to effect a control and, at the same time, allowing said second control means to effect a control when a release action is done without actuating said operating member under a state in which said first flashing mode has been selected by said selecting means.

14. A camera system consisting of a flash device and a camera which has a first flashing mode for making a pre-flashing prior to commencement of an exposure and determining and memorizing, beforehand, a flash light quantity at a time of a main flashing based on a result of said pre-flashing, then directly monitoring a flash light from a flash tube when the main flashing is made by a release action, thus making a flash light irradiation onto an object to be photographed until the monitored flash light quantity reaches a value corresponding to said memorized flash light quantity, and a second flashing mode for adjusting a flash light quantity without making a pre-flashing, comprising:

(a) selecting means for selecting said first or second flashing mode;

(b) an operating member arranged to make a pre-flashing;

(c) pre-flashing means for making said pre-flashing;

(d) first control means for effecting a flash light exposure control under said first flashing mode;

(e) second control means for effecting the flash light exposure control under said second flashing mode; and (f) operation regulating means for actuating said pre-flashing means in response to an actuation of said operating member under a state in which said first flashing mode has been selected by said selecting means and allowing said first control means to effect a control and, at the same time, inhibiting an action of said pre-flashing means irrespective of an actuation of said operating member and allowing said second control means to effect a control under a state in which said second flashing mode has been selected by said selecting means.

15. A camera system consisting of a camera and a flash device, comprising:

(a) synchronizing switch means arranged to shift from a first state to a second state as a leading shutter curtain levels;

(b) a shutter time control timer for counting a predetermined shutter time; and (c) trigger signal forming means for detecting a lapse of said shutter time counted by the timer and a state of said synchronizing switch means and outputting a triggering signal for triggering a flash tube with the condition of AND of the shifting of said synchronizing switch means to the second state and the lapse of said shutter time counted by the timer.

16. A camera system consisting of a flash device and a camera which has a first flashing mode for making a pre-flashing prior to commencement of an exposure and controlling an exposure value by a main flashing based on the information obtained by said pre-flashing, and a second flashing mode for controlling the exposure value by the main flashing without making the pre-flashing, comprising:

(a) selecting means for selecting said first or second flashing mode;

(b) an operating member arranged to make a pre-flashing:

(c) pre-flashing means for making said pre-flashing;

(d) first control means for effecting an exposure control under said first flashing mode;

(e) second control means for effecting the exposure control under said second flashing mode; and (f) operation regulating means for actuating said pre-flashing means in response to an actuation of said operating member under a state in which said first flashing mode has been selected by said selecting means, and allowing said first control means to effect a control and, at the same time, allowing said second control means to effect a control when a release action is done without actuating said operating member under a state in which said first flashing mode has been selected by said selecting means.

17. A camera system consisting of a flash device and a camera which has a first flashing mode for making a pre-flashing prior to commencement of an exposure and controlling an exposure value by a main flashing based on the information obtained by said pre-flashing, and a second flashing mode for controlling the exposure value by the main flashing without making the pre-flashing, comprising:

(a) selecting means for selecting said first or second flashing mode;

(b) an operating member arranged to make a pre-flashing;

(c) pre-flashing means for making said pre-flashing;

(d) first control means for effecting an exposure control under said first flashing mode;

(e) second control means for effecting the exposure control under said second flashing mode; and (f) operation regulating means for actuating said pre-flashing means in response to an actuation of said operating member under a state in which said first flashing mode has been selected by said selecting means and allowing said first control means to effect a control and, at the same time, inhibiting an action of said pre-flashing means irrespective of an actuation of said operating member and allowing said second control means to effect a control under a state said second flashing mode has been selected by said selecting means.

* * * * *